US008176565B2

(12) United States Patent
Takashima et al.

(10) Patent No.: US 8,176,565 B2
(45) Date of Patent: May 8, 2012

(54) INFORMATION PROCESSING APPARATUS, INFORMATION PROCESSING METHOD, AND COMPUTER PROGRAM

(75) Inventors: Yoshikazu Takashima, Tokyo (JP); Kenjiro Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 1087 days.

(21) Appl. No.: 11/279,528

(22) Filed: Apr. 12, 2006

(65) Prior Publication Data

US 2007/0081669 A1 Apr. 12, 2007

(30) Foreign Application Priority Data

Apr. 15, 2005 (JP) ................................ 2005-118711

(51) Int. Cl.
*G06F 21/00* (2006.01)

(52) U.S. Cl. ........................................................ 726/27

(58) Field of Classification Search ........................ None
See application file for complete search history.

(56) References Cited

U.S. PATENT DOCUMENTS

| | | | | |
|---|---|---|---|---|
| 6,424,795 | B1 * | 7/2002 | Takahashi et al. | 386/120 |
| 6,501,727 | B1 * | 12/2002 | Nozaki et al. | 369/275.3 |
| 6,574,735 | B2 * | 6/2003 | Ikeda et al. | 726/31 |
| 6,748,537 | B2 * | 6/2004 | Hughes | 713/193 |
| 7,073,073 | B1 * | 7/2006 | Nonaka et al. | 713/193 |
| 7,096,334 | B2 * | 8/2006 | Moon | 711/164 |
| 7,143,445 | B1 * | 11/2006 | Ishiguro et al. | 726/31 |
| 7,227,953 | B2 * | 6/2007 | Shida | 380/203 |
| 7,228,568 | B2 * | 6/2007 | Abe et al. | 726/31 |
| 7,239,703 | B2 * | 7/2007 | Higurashi et al. | 380/203 |
| 7,403,695 | B2 * | 7/2008 | Kikuchi et al. | 386/241 |
| 7,412,606 | B2 * | 8/2008 | Asano et al. | 713/193 |
| 7,421,742 | B2 * | 9/2008 | Kitani et al. | 726/31 |
| 7,549,044 | B2 * | 6/2009 | Lee et al. | 713/167 |
| 7,551,838 | B2 * | 6/2009 | Ishii | 386/248 |
| 7,555,779 | B2 * | 6/2009 | Nakano et al. | 726/26 |
| 7,715,558 | B2 * | 5/2010 | Yamamoto et al. | 380/201 |
| 7,770,795 | B2 * | 8/2010 | Takashima et al. | 235/454 |
| 7,783,172 | B2 * | 8/2010 | Seo et al. | 386/241 |
| 7,809,775 | B2 * | 10/2010 | Seo et al. | 707/822 |
| 2002/0099661 | A1 * | 7/2002 | Kii et al. | 705/51 |
| 2003/0016826 | A1 * | 1/2003 | Asano et al. | 380/277 |
| 2003/0086568 | A1 | 5/2003 | Kato et al. | |
| 2003/0095664 | A1 * | 5/2003 | Asano et al. | 380/277 |
| 2003/0118181 | A1 * | 6/2003 | Miwa et al. | 380/201 |
| 2003/0152368 | A1 * | 8/2003 | Kitani | 386/94 |

(Continued)

FOREIGN PATENT DOCUMENTS

JP 2002158974 5/2002

(Continued)

*Primary Examiner* — Nathan Flynn
*Assistant Examiner* — Michael R Vaughan
(74) *Attorney, Agent, or Firm* — K&L Gates LLP

(57) ABSTRACT

An information processing apparatus is provided. The information processing apparatus includes a cryptographic processor configured to generate encrypted data associated with a content management unit by executing encryption using a unit key associated with the content management unit, the content management unit being defined as a unit for controlling usage of content; a management-information controller configured to generate or update a unit key file storing the unit key and a usage-control-information file associated with the content management unit as management information associated with the encrypted data generated by the cryptographic processor; and a recorder configured to record the encrypted data, the unit key file, and the usage-control-information file on an information recording medium according to a predetermined data recording format.

25 Claims, 36 Drawing Sheets

U.S. PATENT DOCUMENTS

2004/0027393 A1* 2/2004 Kato et al. .................... 345/838
2004/0030902 A1* 2/2004 Asano et al. .................. 713/176
2004/0034796 A1* 2/2004 Clark ............................ 713/201
2004/0039907 A1* 2/2004 Sako et al. .................... 713/164
2004/0156503 A1* 8/2004 Bell et al. ........................ 380/44
2005/0105727 A1* 5/2005 Takashima et al. ........... 380/201
2005/0114295 A1* 5/2005 Takashima ........................ 707/1
2005/0117880 A1* 6/2005 Seo et al. ........................ 386/69
2005/0131998 A1* 6/2005 Takashima .................... 709/203
2005/0177740 A1* 8/2005 Athaide et al. ................ 713/189
2005/0289139 A1* 12/2005 Takashima et al. ............... 707/5
2006/0195911 A1* 8/2006 Takashima ...................... 726/27
2006/0227973 A1* 10/2006 Takashima et al. ........... 380/277
2007/0107066 A1* 5/2007 Morinaga et al. ............... 726/31
2008/0063200 A1* 3/2008 Takashima et al. ........... 380/201
2008/0320598 A1* 12/2008 Ben-Yaacov et al. ........... 726/26

FOREIGN PATENT DOCUMENTS

JP 2003116100 4/2003

* cited by examiner

FIG. 13

| | Syntax | No. of bits |
|---|---|---|
| | CPS Unit Key File { | |
| | Unit_Key_Block_start_address | 32 |
| | Reserved for future use | 96 |
| 201 | Unit_Key_File_Header() | |
| 201 | For (I=0 ; I<X ; I++){ | (*1) |
| 201 | padding word#I | 16 |
| 201 | } | |
| 202 | Unit_Key_Block() | |
| 202 | For (J=0 ; J<Y ; J++){ | (*2) |
| 202 | padding word | 16 |
| 202 | } | |
| | } | |

(*1) X is decided to align the start byte of Unit_Key_Block() to 16 bytes boundary.
(*2) Y is decided to align the end of CPS Unit Key File to 16 bytes boundary.

FIG. 14A

| Syntax | No. of bits |
|---|---|
| Unit_Key_File_Header(){ | |
| Application_Type (= $2_{16}$) | 16 |
| Num_of_BD_Directory | 16 |
| For(I=0; I < Num_of_BD_Directory; I++){ | 16 |
| CPS_Unit_number for Menu Thumbnail#I | 16 |
| CPS_Unit_number for Mark Thumbnail#I | 16 |
| Num_of_Clip#I | 16 |
| For(J=0; J < Num_of_Clip; J++){ | |
| Clip_ID#J in Directory #I | 16 |
| CPS_Unit_number for Title#J in Directory #I | 16 |
| } | |
| } | |

FIG. 14B

| Syntax | No. of bits |
|---|---|
| Unit_Key_Block(){ | |
| Num_of_CPS_Unit | 16 |
| Reserved | 112 |
| For(I=0; I < Num_of_CPS_Unit; I++){ | |
| MAC of Usage Rules#I | 128 |
| MAC of Media ID#I | 128 |
| Encrypted CPS Unit Key for CPS Unit#I | 128 |
| } | |
| } | |

FIG. 17

| | #bytes |
|---|---|
| Unit_Key.inf(){ | |
| ⎧ CPS_Unit_number for Menu Thumbnail | 2 |
| ⎪ CPS_Unit_number for Mark Thumbnail | 2 |
| 301 ⎨ Num_of_PlayList (np) | 2 |
| ⎪ CPS_Unit_number for PlayList#1 | 2 |
| ⎪ ... | |
| ⎩ CPS_Unit_number for PlayList#np | 2 |
| ⎧ Num_of_CPS_Unit (ncu) | 2 |
| ⎪ Encrypted Unit Key for CPS Unit#1 | 16 |
| 302 ⎨ ... | |
| ⎩ Encrypted Unit Key for CPS Unit#ncu | 16 |
| } | |

FIG. 18

```
                                                        #bytes
Unit_Key.inf(){
    ⎧ CPS_Unit_number for Menu Thumbnail                2
    ⎪ CPS_Unit_number for Mark Thumbnail                2
    ⎪ Num_of_PlayList (np)                              2
311 ⎨ For(I = 0; I < np; I++){
    ⎪         PlayList_ID(I)                            2   (VALUES FROM 00000 TO 99999)
    ⎪         CPS_Unit_number for PlayList(I)           2
    ⎩ }
    ⎧ Num_of_CPS_Unit (ncu)                             2
312 ⎨ For(J = 0; J < ncu; J++){
    ⎪         Encrypted Unit Key for CPS Unit#J         16
    ⎩ }
}
```

FIG. 19

| Syntax | #bytes |
|---|---|
| Unit_Key.inf(){ | |
| 321 { CPS_Unit_number for Menu Thumbnail | 2 |
| CPS_Unit_number for Mark Thumbnail | 2 |
| Num_of_Clip (nc) | 2 |
| CPS_Unit_number for Clip#1 | 2 |
| ... | |
| CPS_Unit_number for Clip#nc | 2 |
| 322 { Num_of_CPS_Unit (ncu) | 2 |
| Encrypted Unit Key for CPS Unit#1 | 16 |
| ... | |
| Encrypted Unit Key for CPS Unit#ncu | 16 |
| } | |

FIG. 20

```
                                                         #bytes
Unit_Key.inf(){
      CPS_Unit_number for Menu Thumbnail                 2
      CPS_Unit_number for Mark Thumbnail                 2
      Num_of_Clip (nc)                                   2
331   For(I = 0; I < nc; I++){
              Clip_ID(I)                                 2   (VALUES FROM 00000 TO 99999)
              CPS_Unit_number for Clip(I)                2
      }
      Num_of_CPS_Unit (ncu)                              2
332   For(J = 0; J < ncu; J++){
              Encrypted Unit Key for CPS Unit#J          16
      }
}
```

FIG. 21

| | #bytes |
|---|---|
| Unit_Key.inf(){ | |
| Encrypted Key for Menu Thumbnail | 16 |
| Encrypted Key for Mark Thumbnail | 16 |
| Num_of_PlayList (np) | 2 |
| Encrypted Key for PlayList#1 | 16 |
| ... | |
| Encrypted Key for PlayList#np | 16 |
| } | |

```
                                                    #bytes
Unit_Key.inf(){
     Encrypted Key for Menu Thumbnail               16
     Encrypted Key for Mark Thumbnail               16
     Num_of_PlayList (np)                           2
351  For(I=0; I < np; I++){
             PlayList_ID(I)                         2   (VALUES FROM 00000 TO 99999)
              Encrypted Key for PlayList(I)         16
}
```

FIG. 23

```
                                                    #bytes
Unit_Key.inf(){
     Encrypted Key for Menu Thumbnail               16
     Encrypted Key for Mark Thumbnail               16
     Num_of_Clip (nc)                               2
361       Encrypted Key for Clip#1                  16
                ...
          Encrypted Key for Clip#nc                 16
}
```

FIG. 24

```
                                                         #bytes
Unit_Key.inf(){
     Encrypted Key for Menu Thumbnail                    16
     Encrypted Key for Mark Thumbnail                    16
     Num_of_Clip (np)                                    2
371  For(I = 0; I < nc; I++){
              Clip_ID(I)                                 2      (VALUES FROM 00000 TO 99999)
               Encrypted Key for Clip#nc                 16
}
```

FIG. 28

| CCI_and_other_info_type | Meaning |
|---|---|
| $0000_{16}$ | RESERVED |
| $0001_{16}$ | RESERVED FOR BASIC CCI FOR BD-CPS |
| $0002_{16}$-$0100_{16}$ | RESERVED |
| $0101_{16}$ | BASIC CCI FOR AACS |
| $0102_{16}$ | CCI SEQUENCE INFORMATION |
| $0103_{16}$-$0110_{16}$ | RESERVED |
| $0111_{16}$ | RESERVED FOR BASIC TITLE USAGE FOR AACS |
| $0112_{16}$ | RESERVED FOR KEY MANAGEMENT INFORMATION FOR NETWORK TRANSACTION |
| $0113_{16}$ | RESERVED FOR URI INFORMATION FOR MANAGED COPY |
| $0114_{16}$-$FFFF_{16}$ | RESERVED |

FIG. 29

| [field name] | | [num_of_bits] |
|---|---|---|
| Basic CCI for AACS { | | |
| CCI_and_other_info_type | $(=0101_{16})$ | 16 |
| CCI_and_other_info_data_length | $(=0010_{16})$ | 16 |
| reserved | | |
| EPN | | |
| CCI | | |
| reserved | | |
| Image_Constraint_Token | | |
| APS | | |
| reserved | | |
| } | | |

FIG. 30

| Syntax | No. of bits |
|---|---|
| CCI Sequence Information { | |
| CCI_and_other_info_type (=0102$_{16}$) | 16 |
| CCI_and_other_info_data_length | 16 |
| Number of CCI sequence | 16 |
| For (I = 0 ; I < Number of CCI sequence ; I++){ | |
| Start SPN for CCI Sequence | 5 |
| EPN | 1 |
| CCI | 2 |
| reserved | 5 |
| Image_Constraint_Token | 1 |
| APS | 2 |
| reserved | 112 |
| } | |
| } | |

INFORMATION PROCESSING APPARATUS, INFORMATION PROCESSING METHOD, AND COMPUTER PROGRAM

CROSS REFERENCES TO RELATED APPLICATIONS

The present application claims priority to Japanese Patent Application JP 2005-118711 filed in the Japanese Patent Office on Apr. 15, 2005, the entire contents of which are incorporated herein by reference.

BACKGROUND

The present application relates to information processing apparatuses, information processing methods, and computer programs. More specifically, the present application relates to, for example, an information processing apparatus, an information processing method, and a computer program for controlling usage of content in divided units in a scheme where content such as digital broadcast content is recorded on an information recording medium and the content recorded is used.

Various types of software data (hereinafter referred to as "content"), for example, audio data such as music, image data such as movies, game programs, and various application programs, can be stored as digital data in recording media, such as a Blu-ray disc®, which employs blue lasers, a digital versatile disc (DVD), a mini disc (MD), and a compact disc (CD). In particular, a Blu-ray disc®, which employs blue lasers, allow high-density recording, so that a large volume of video content or the like can be recorded at a high quality.

These various types of information recording media include read-only memory (ROM) media that has data recorded thereon in advance and that do not allow writing new data thereon and writable media that allow writing data thereon. Using a writable information recording medium, for example, a user can receive content through digital data broadcasting, write the content received on the information recording medium, and play back and use the content.

Generally, the copyrights and distribution rights of many items of content, such as broadcast content, music data, and image data, are owned by creators or vendors of the content. Accordingly, when distributing the content, usually, certain usage restrictions are imposed, i.e., only authorized users are permitted to use the content so that unauthorized copying or the like is prohibited.

Digital recording apparatuses and recording media allow repeated recording and playback of, for example, image or sound without degrading the quality thereof. Accordingly, the distribution of illegitimately copied content via the Internet, the distribution of what are called pirate discs manufactured by copying content on CD-Rs or the like, or the use of copied content stored on hard discs of personal computers (PCs) or the like causes the problem of copyright infringement.

A high-capacity recording media, such as a DVD or a type of recently developed recording medium employing blue lasers, can record a large volume of data, for example, corresponding to one or several movies, on a single medium in the form of digital information. As it becomes possible to record video information or the like in the form of digital information, it becomes increasingly important to protect copyright owners by preventing unauthorized copying. Recently, in order to prevent unauthorized copying of such digital data, various techniques for preventing illegitimate copying have been implemented in digital recording apparatuses and recording media.

For example, a content scramble system is employed for DVD players. In the content scramble system, video data, audio data, or the like is recorded on a DVD-ROM in an encrypted form, a key for decrypting the encrypted data is assigned to a DVD player having a license. The license is provided to a DVD player that is designed so as to comply with predetermined operation rules, such as not performing unauthorized copying. Thus, the DVD player having the license can play back image and sound from the DVD-ROM by decrypting the encrypted data recorded on the DVD-ROM using the key assigned.

On the other hand, a DVD player not having a license is not allowed to playback the encrypted data recorded on the DVD-ROM since the DVD player does not have the key for decrypting the encrypted content. As described above, in the content scramble system, a DVD player that does not satisfy certain conditions at the time of licensing is not allowed to play back digital data recorded on a DVD-ROM, so that unauthorized copying is prevented.

A scheme for controlling usage of content through encryption of content in recording and playback of content on and from an information recording medium that allows recording data thereon is described, for example, in Japanese Unexamined Patent Application Publication No. 2003-116100.

Content that is recorded on information recording media include various types of content. Thus, a scheme in which usage of pieces of content is managed individually, for example, in which usage of pieces of content is managed in different modes according to content providers, is desired. However, it is not readily possible to implement such usage control under existing systems. Furthermore, it causes inconvenience to employ the same scheme of management for a recording format and a playback format. On the other hand, the load of a playback apparatus increases when totally different schemes of management are employed.

SUMMARY

There is a need for an information processing apparatus, an information processing method, and a computer program for individually controlling usage of pieces of content stored on an information recording medium or recorded by a user.

According to an embodiment, there is provided an information processing apparatus including a cryptographic processor configured to generate encrypted data associated with a content management unit by executing encryption using a unit key associated with the content management unit, the content management unit being defined as a unit for controlling usage of content; a management-information controller configured to generate or update a unit key file storing the unit key and a usage-control-information file associated with the content management unit as management information associated with the encrypted data generated by the cryptographic processor; and a recorder configured to record the encrypted data, the unit key file, and the usage-control-information file on an information recording medium according to a predetermined data recording format.

The data recorded on the information recording medium may include moving-image content composed of hierarchically structured data having one or more playlists and having one or more clips including one or more audio-video streams, and the management-information controller may be configured to generate or update a unit key file including pieces of content-management-unit identification information associated with the individual clips and including pieces of unit key information associated with the individual pieces of content-management-unit identification information.

The data recorded on the information recording medium may include moving-image content composed of hierarchically structured data having one or more playlists and having one or more clips including one or more audio-video streams, and the management-information controller may be configured to generate or update a unit key file including pieces of content-management-unit identification information associated with the individual playlists and including pieces of unit key information associated with the individual pieces of content-management-unit identification information.

The data recorded on the information recording medium may include moving-image content composed of hierarchically structured data having one or more playlists and having one or more clips including one or more audio-video streams, and the management-information controller may be configured to generate or update a unit key file including pieces of unit key information associated with individual pieces of clip identification information.

The data recorded on the information recording medium may include moving-image content composed of hierarchically structured data having one or more playlists and having one or more clips including one or more audio-video streams, and the management-information controller may be configured to generate or update a unit key file including pieces of unit key information associated with individual pieces of playlist identification information.

The data recorded on the information recording medium may include moving-image content composed of hierarchically structured data having one or more playlists and having one or more clips including one or more audio-video streams, and the management-information controller may be configured to generate or update a usage-control-information file in which different pieces of control information are recorded in association with individual identifiers of at least one of playlists, clips, and titles associated with pieces of content.

The data recorded on the information recording medium may include moving-image content composed of hierarchically structured data having one or more playlists and having one or more clips including one or more audio-video streams, and the management-information controller may be configured to generate or update a usage-control-information file in which different pieces of control information are recorded in association with individual points of change in control information in the clips.

The data recorded on the information recording medium may include moving-image content composed of hierarchically structured data having one or more playlists and having one or more clips including one or more audio-video streams, and the information processing apparatus may further include a data editor configured to execute joining, division, or deletion of the playlists, and the management-information controller may be configured to update the unit key file storing the unit key or the usage-control-information file associated with the content management unit in accordance with processing executed by the data editor.

The unit key file may include an application type indicating whether the unit key file is recorded according to a recording format for which a specification regarding editing of content is defined or in which a program file is not included, or the unit key file is recorded according to a playback format for which a specification regarding editing of content is not defined or in which a program file is included.

The data recorded on the information recording medium may include content composed of hierarchically structured data having one or more playlists and having one or more clips including one or more audio-video streams, and content management units may be set in association with the individual clips when the data is recorded according to the recording format, and content management units may be set in association with individual titles that serve as logical units when the data is recorded according to the playback format.

According to another embodiment, there is provided an information processing apparatus for playing back content recorded on an information recording medium, the information processing apparatus including a cryptographic processor configured to obtain a unit key associated with a content management unit from a unit key file, the content management unit being defined as a unit for controlling usage of content, and to decrypt encrypted content recorded on the information recording medium using the unit key obtained; and a content-usage controller configured to obtain usage control information associated with the content management unit to which the content decrypted by the cryptographic processor belongs, and to use the content according to the usage control information obtained.

The data recorded on the information recording medium may include moving-image content composed of hierarchically structured data having one or more playlists and having one or more clips including one or more audio-video streams, and the content-usage controller may be configured to use content in different modes of usage control in accordance with playlists used, clips, or titles associated with pieces of content, on the basis of usage control information in which different pieces of control information are recorded in association with individual identifiers of at least one of the playlists, the clips, and the pieces of content.

The data recorded on the information recording medium may include moving-image content composed of hierarchically structured data having one or more playlists and having one or more clips including one or more audio-video streams, and the content-usage controller may be configured to use content in different modes of usage control before and after points of change in control information in the clips, on the basis of usage control information in which different pieces of control information are recorded in association with the individual points of change in control information.

According to another embodiment, there is provided an information processing method for recording content on an information recording medium, the information processing method including the steps of generating encrypted data associated with a content management unit using a unit key associated with the content management unit, the content management unit being defined as a unit for controlling usage of content; controlling management information associated with the encrypted data generated in the encrypting step, by generating or updating a unit key file storing the unit key and a usage-control-information file associated with the content management unit; and recording the encrypted data, the unit key file, and the usage-control-information file on the information recording medium according to a predetermined data recording format.

The data recorded on the information recording medium may include moving-image content composed of hierarchically structured data having one or more playlists and having one or more clips including one or more audio-video streams, and the management-information controlling step may generate or update a unit key file including pieces of content-management-unit identification information associated with the individual clips and including pieces of unit key information associated with the individual pieces of content-management-unit identification information.

The data recorded on the information recording medium may include moving-image content composed of hierarchically structured data having one or more playlists and having one or more clips including one or more audio-video streams, the management-information controlling step may generate or update a usage-control-information file in which different pieces of control information are recorded in association with individual identifiers of at least one of playlists, clips, and titles associated with pieces of content.

The data recorded on the information recording medium may include moving-image content composed of hierarchically structured data having one or more playlists and having one or more clips including one or more audio-video streams, and the management-information controlling step may generate or update a usage-control-information file in which different pieces of control information are recorded in association with individual points of change in control information in the clips.

The data recorded on the information recording medium may include moving-image content composed of hierarchically structured data having one or more playlists and having one or more clips including one or more audio-video streams, and the information processing apparatus may further include the step of editing data, the editing involving joining, division, or deletion of the playlists, and the management-information controlling step may update the unit key file storing the unit key or the usage-control-information file associated with the content management unit in accordance with processing executed in the data editing step.

According to another embodiment, there is provided an information processing method for playing back content recorded on an information recording medium, the information processing method including the steps of obtaining a unit key associated with a content management unit from a unit key file, the content management unit being defined as a unit for controlling usage of content, and decrypting encrypted content recorded on the information recording medium using the unit key obtained; and obtaining usage control information associated with the content management unit to which the content decrypted in the decrypting step belongs, and using the content according to the usage control information obtained.

The data recorded on the information recording medium may include moving-image content composed of hierarchically structured data having one or more playlists and having one or more clips including one or more audio-video streams, and the content-usage controlling step may use content in different modes of usage control in accordance with playlists used, clips, or titles associated with pieces of content, on the basis of usage control information in which different pieces of control information are recorded in association with individual identifiers of at least one of the playlists, the clips, and the pieces of content.

The data recorded on the information recording medium may include moving-image content composed of hierarchically structured data having one or more playlists and having one or more clips including one or more audio-video streams, and the content-usage controlling step may use content in different modes of usage control before and after points of change in control information in the clips, on the basis of usage control information in which different pieces of control information are recorded in association with the individual points of change in control information.

According to another embodiment, there is provided a computer program for allowing a computer to execute a process of recording content on an information recording medium, the computer program including the steps of generating encrypted data associated with a content management unit using a unit key associated with the content management unit, the content management unit being defined as a unit for controlling usage of content; controlling management information associated with the encrypted data generated in the encrypting step, by generating or updating a unit key file storing the unit key and a usage-control-information file associated with the content management unit; and recording the encrypted data, the unit key file, and the usage-control-information file on the information recording medium according to a predetermined data recording format.

According to another embodiment, there is provided a computer program for allowing a computer to execute a process of playing back content recorded on an information recording medium, the computer program including the steps of obtaining a unit key associated with a content management unit from a unit key file, the content management unit being defined as a unit for controlling usage of content, and decrypting encrypted content recorded on the information recording medium using the unit key obtained; and obtaining usage control information associated with the content management unit to which the content decrypted in the decrypting step belongs, and using the content according to the usage control information obtained.

According to another embodiment, there is provided an information recording medium having recorded encrypted content thereon, the encrypted content being managed on the basis of hierarchically structured data having one or more playlists and having one or more clips including one or more audio-video streams, and the encrypted content being encrypted using unit keys on a basis of individual content management units, wherein a unit key file storing the unit keys associated with the content management units is recorded on the information recording medium, and wherein the unit key file includes an application type indicating whether the unit key file is recorded according to a recording format for which a specification regarding editing of content is defined or in which a program file is not included, or the unit key file is recorded according to a playback format for which a specification regarding editing of content is not defined or in which a program file is included.

Units managed on the basis of the content management units may vary depending on the application type.

According to another embodiment, there is provided a signal for managing encrypted content, the encrypted content being managed on the basis of hierarchically structured data having one or more playlists and having one or more clips including one or more audio-video streams, and the encrypted content being encrypted using unit keys on a basis of individual content management units, the signal including a unit key file storing the unit keys associated with the content management units, wherein the unit key file includes an application type indicating whether the encrypted content is content managed according to a playback format or content managed according to a recording format.

According to an embodiment of the present invention, encrypted data associated with a content management unit (CPS (content protection system) unit) that is defined as a unit for controlling usage of content is generated through encryption using a unit key associated with the content management unit, and a unit key file storing the unit key or a usage-control-information file associated with the content management unit is generated or updated on recorded on an information recording medium as management information. When content is played back, a key is obtained from the management information and control is exercised on the basis of the management information.

The unit key file is, for example:

a) Unit key file including pieces of content management unit identification information associated with individual clips and pieces of unit key information associated with individual pieces of content management unit identification information;

b) Unit key file including pieces of content management unit identification information associated with individual playlists and pieces of unit key information associated with individual pieces of content management unit identification information;

c) Unit key file including pieces of unit key information associated with individual pieces of clip identification information; or d) Unit key file including pieces of unit key information associated with individual pieces of playlist identification information.

The management information is, for example:

a) Usage control information in which different pieces of control information are recorded on a basis of individual identifiers of at least one of playlists, clips, and titles associated with pieces of content; or b) Usage control information in which different pieces of control information are recorded on a basis of individual points of change in control information in clips.

Accordingly, when content is used, a unit key is obtained from the management information, and usage is controlled according to the individual pieces of control information.

Additional features and advantages are described herein, and will be apparent from, the following Detailed Description and the figures.

BRIEF DESCRIPTION OF THE FIGURES

FIG. 13 is a diagram showing a CPS unit key file storing CPS unit keys associated with content management units (CPS units);

FIGS. 14A and 14B are diagrams showing an example of the structure of a CPS unit key file storing CPS unit keys associated with content management units (CPS units);

FIG. 17 is a diagram showing an example of the structure of a CPS unit key file;

FIG. 18 is a diagram showing an example of the structure of a CPS unit key file;

FIG. 19 is a diagram showing an example of the structure of a CPS unit key file;

FIG. 20 is a diagram showing an example of the structure of a CPS unit key file;

FIG. 21 is a diagram showing an example of the structure of a CPS unit key file;

FIG. 22 is a diagram showing an example of the structure of a CPS unit key file;

FIG. 23 is a diagram showing an example of the structure of a CPS unit key file;

FIG. 24 is a diagram showing an example of the structure of a CPS unit key file;

FIG. 28 is a diagram showing types of usage control information (CCI);

FIG. 29 is a diagram showing a syntax of Basic CCI for AACS;

FIG. 30 is a diagram showing the data structure of CCI Sequence Information in which information is recorded on a basis of individual points of change in CCI in clips;

DETAILED DESCRIPTION

Now, information processing apparatuses, information processing methods, and computer programs according to embodiments of the present invention will be described in detail with reference to the drawings. The description is given in the following order of topics:

1: Overview of Content Storage Format
2. Scheme of Content Management
   2.1 Scheme of encryption based on individual pieces of data
   2.2 Scheme of management based on content management units (CPS units)
   2.3 Scheme of management based on content management units (CPS units) for allowing cross-playlist editing
3. Structure of Unit Key File
4. Structure of Usage Control Information (CCI)
5. Processes of Recording, Editing, and Playing Back Content
6. Example Configuration of Information Processing Apparatus

1. Overview of Content Storage Format

Figure 1:
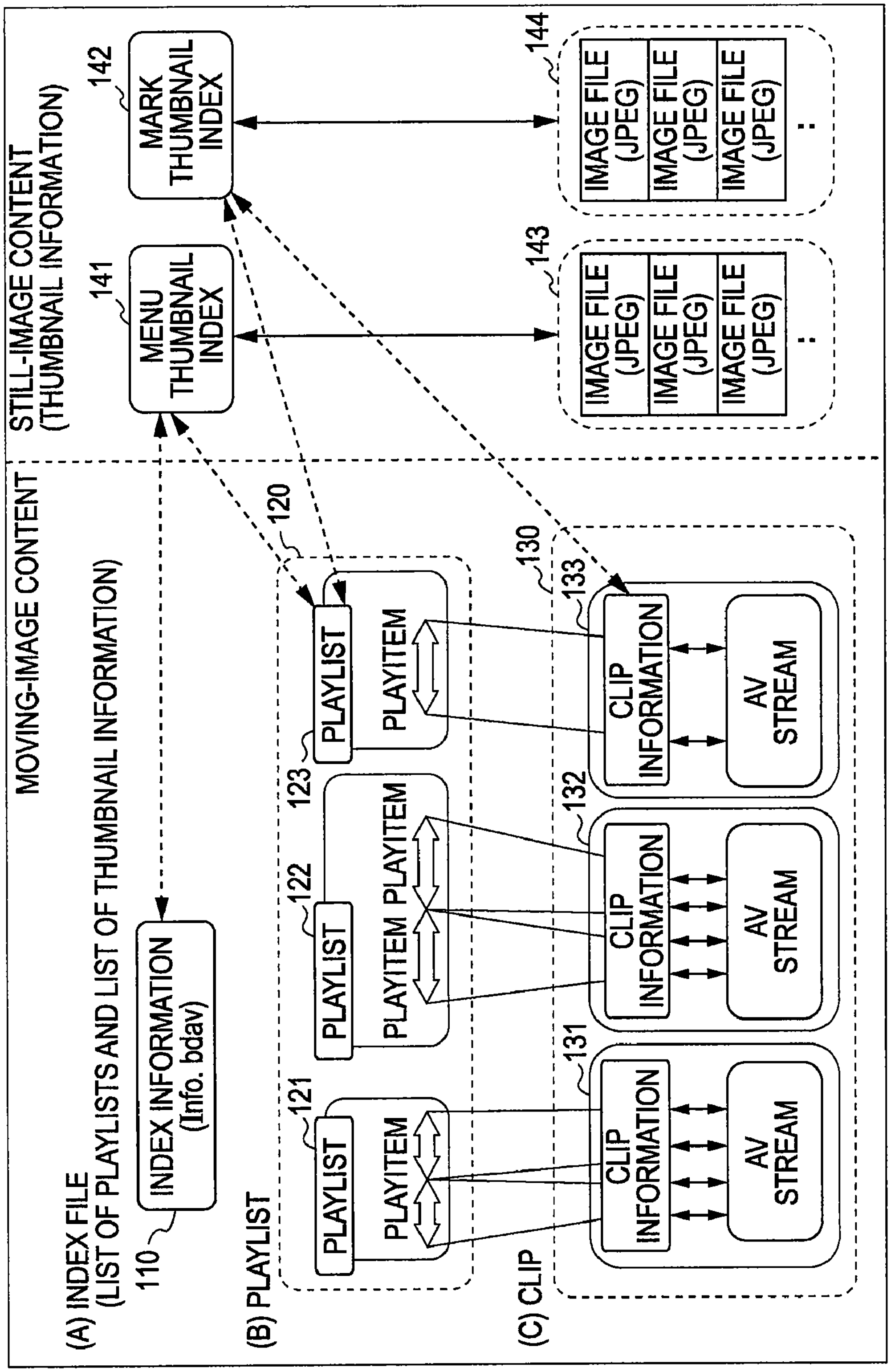
FIG. 1 is a diagram showing a recording format of data stored on an information recording medium.

FIG. 1 is a diagram showing the structure of a content storage format on an information recording medium that is mounted on an information processing apparatus according to an embodiment of the present invention and used for recording and playing back data. The diagram shows the structure of a content storage format in a case where, for example, broadcast content or the like is recorded on an information recording medium using an application program for recording data.

As shown in FIG. 1, content can be classified into moving-image content and still-image content. Moving-image content has a hierarchical structure of (A) an index information file 110, (B) playlists 120, and (C) clips 130. In the layer of (B) playlists 120, a plurality of playlists 121 to 123 is included. In the layer of (C) clips 130, a plurality of pieces of clip information and clip AV stream files 131 to 133 composed of AV streams as actual content data are included.

The index information file 110 is retrieved by a playback application that is executed by an information processing apparatus having the information recording medium mounted thereon, and one of the playlists 121 to 123, or a menu thumbnail index 141 or a mark thumbnail index 142 of still-image content is selected from the index information 110 as specified by a user.

When moving-image content is played back, one of the playlists 121 to 123 is selected. Each playlist includes playitems as data information that is to be played back. On the basis of clip information representing playback segments defined by the playitems included in the playlist, an AV stream as actual content data is read selectively and the AV stream is played back. A large number of playlists and playitems exists, and each has a playlist ID or playitem ID as identification information associated therewith.

Generally, a data file used in a computer or the like is handled as a byte sequence. The content of the clip AV stream files 131 to 133 is expanded on a temporal axis, and a playlist specifies access points in the clips mainly by timestamps. When a playlist indicates access points in the clips by timestamps, a clip information file is used to find an address where decoding of a stream is to be started in a clip AV stream file.

By using the playlists 120, a user can select playback segments the user wishes to view from the clips 130 and readily edit the playback segments. Each playlist is a collection of playback segments in a clip. Each playback segment in a clip is referred to as a playitem, which is represented by a pair of an IN point and an OUT point on the temporal axis. A playlist is defined as a set of playitems.

As shown in FIG. 1, on the information recording medium, still-image content as well as moving-image content is recorded. Still-image content includes thumbnails. The thumbnails are, for example, still images corresponding to individual pieces of moving-image content. Two types of thumbnail exist, as shown in FIG. 1. One is a menu thumbnail that serves as a representative image representing a piece of content. The menu thumbnail is mainly used in a menu screen for allowing the user to select an image the user wishes to view by operating a cursor. The other is a mark thumbnail, which is an image representing a scene indicated by a mark. The mark thumbnail is composed, for example, by a thumbnail image of a scene selected by the user.

For example, JPEG image files 143 and 144 are set as these thumbnails. A still image to be displayed can be selected using either a menu thumbnail index 141 or a mark thumbnail index 142.

2. Scheme of Content Management

Now, a plurality of schemes for controlling usage of content stored on an information recording medium using the file format described above will be described.

2.1 Scheme of Encryption Based on Individual Pieces of Data

Figure 2:
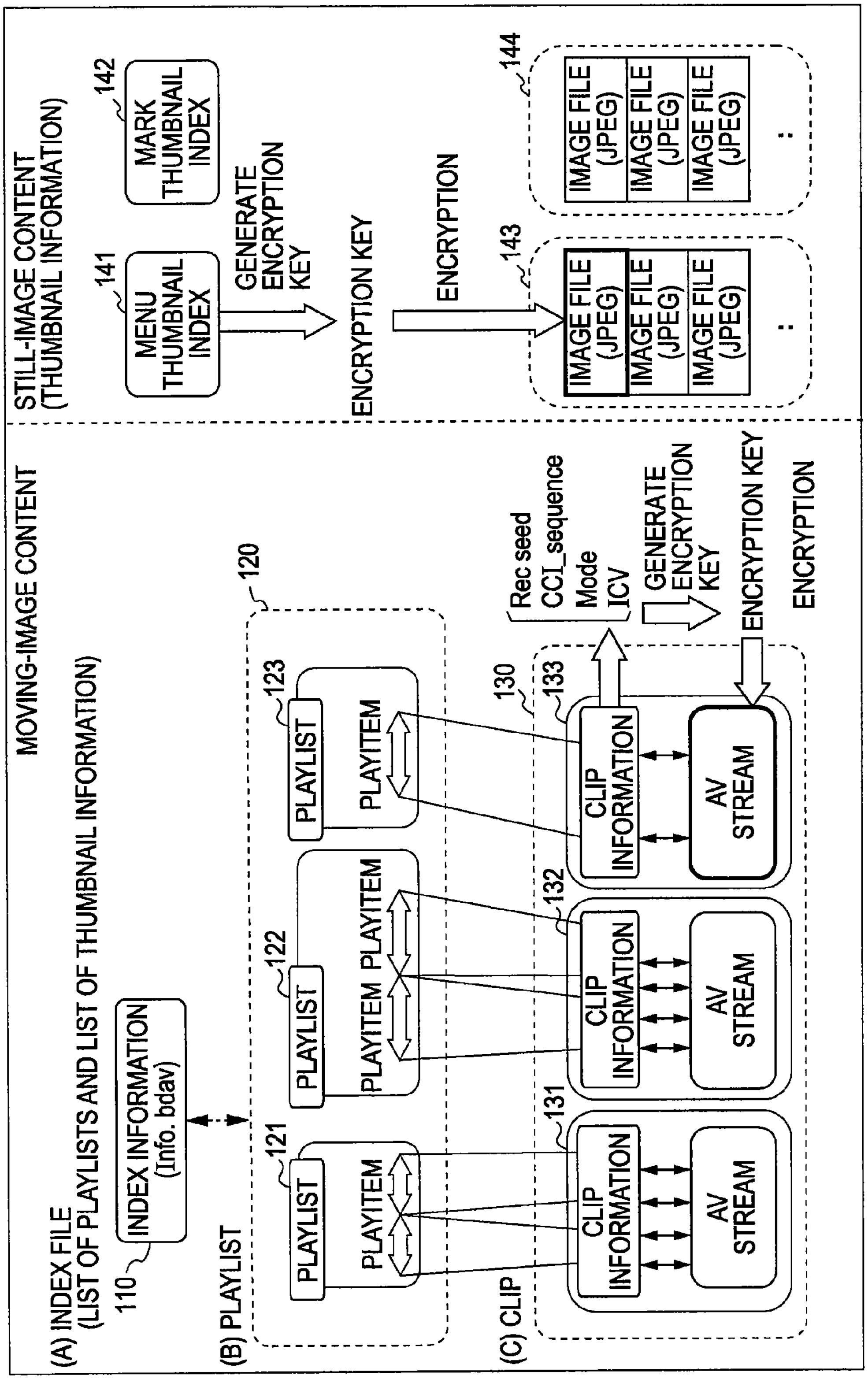
FIG. 2 is a diagram showing an example scheme of encryption of data stored on an information recording medium.

Referring first to FIG. 2, a scheme of encryption based on individual pieces of data will be described. In this example scheme, as shown in FIG. 2, data that is to be encrypted is an AV stream in moving-image content and a still-image file in still-image content, and these pieces of actual content data are encrypted individually.

An encryption key that is used to encrypt an AV stream in moving-image content is generated through an encryption-key generating process using data included in clip information that is set in association with the AV stream to be encrypted. For example, an encryption key is generated using input of data recorded in the clip information, such as a recording seed (Rec Seed), a CCI (Copy Control Information) sequence that serves as usage control information of the content, mode information, or an ICV (Integrity Check Value) for verifying data integrity, and the AV stream is encrypted, for example, by 6-KB block encryption using the encryption key generated.

An encryption key that is used to encrypt a still-image file composed of a thumbnail image is generated using input of data such as a recording seed (Rec Seed) obtained from information included in a menu thumbnail index or a mark thumbnail index that is set in association with the thumbnail image to be encrypted, and the image file is encrypted, for example, by 2-KB encryption using the encryption key generated.

Although a scheme of encryption of a single AV stream and a single still-image file has been described with reference to FIG. 2, other AV streams are also encrypted individually using encryption keys based on constituent data of associated pieces of clip information, and image files including thumbnails are also individually encrypted using encryption keys generated from information included in a menu thumbnail index or a mark thumbnail index. According to the scheme described above, for example, even when an encryption key for a certain AV stream is leaked, the key is not applicable as encryption keys for other AV streams. Thus, pieces of content can be managed individually, so that more robust data protection can be achieved.

2.2 Scheme of Management Based on Content Management Units (CPS Units)

Next, a scheme of content management based on setting of content management units (CPS units) will be described with reference to FIG. 3. In this example scheme, content stored on an information recording medium is encrypted using different keys assigned to individual units so that the usage of the individual units can be controlled in different ways. That is, content is divided into content management units (CPS units), and the CPS units are encrypted using individual keys (CPS units keys) so that the usage of the CPS units can be managed individually.

When the content is used, CPS unit keys assigned to individual units are obtained, and the content is played back by executing data processing according to a predetermined decoding process sequence using other keys, key generation information, and so forth in addition to the CPS unit keys.

Various manners of setting are possible for content management units (CPS units). One manner of setting for content management units (CPS units) will be described with reference to FIG. 3.

Figure 3:
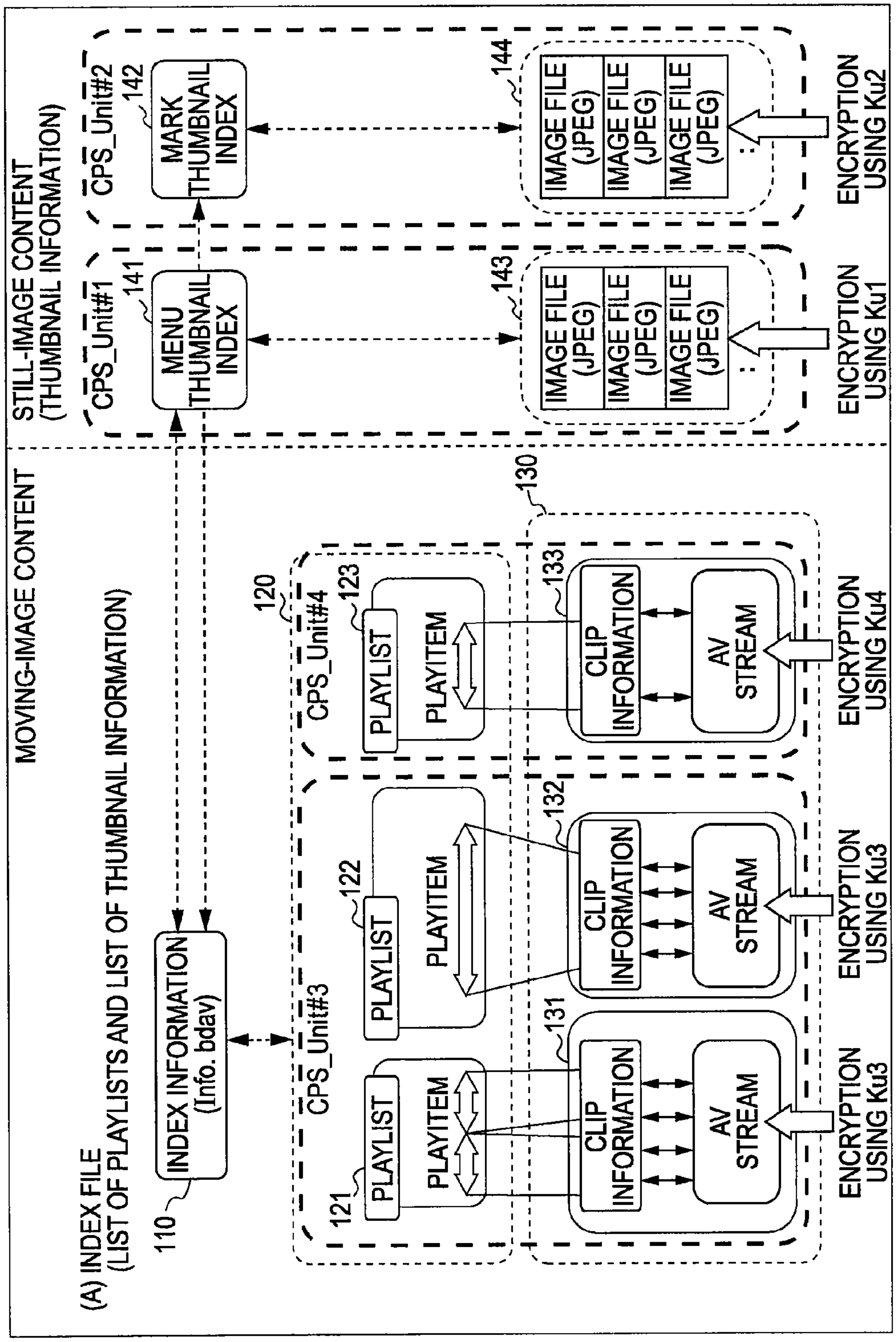
FIG. 3 is a diagram showing an example setting of a content management units (CPS units) corresponding to data stored on an information recording medium.

In the example shown in FIG. 3, as for moving-image content, content management units (CPS units) associated with one or more playlists are set, and as for still-image content, content management units (CPS units) are set individually for a menu thumbnail and a mark thumbnail.

In the case of still-image content, a set of image files of menu thumbnails is defined as a CPS unit 1 (content management unit 1), and the CPS unit 1 is encrypted using a unit key [Ku1] associated with the CPS unit 1. In this example, data that is to be encrypted is an image file. Also, a set of image files of mark thumbnails is defined as a CPS unit 2, and the CPS unit 2 is encrypted using a unit key [Ku2] associated with the CPS unit 2.

In the case of moving-image content, data including clip files specified by a playlist 121 and a playlist 122 is defined as a CPS unit 3, and the CPS unit 3 is encrypted using a unit key [Ku3] associated with the CPS unit 3. In this example, data that is to be encrypted is an AV stream. Furthermore, data including a clip file specified by a playlist 123 is defined as a CPS unit 4, and the CPS unit 4 is encrypted using a unit key [Ku4] associated with the CPS unit 4.

For example, when the user wishes to play back content corresponding to the CPS unit 3, the unit key Ku3, i.e., the encryption key set in association with the CPS unit 3, is obtained for decoding. When the user wishes to play back content corresponding to the CPS unit 4, the unit key Ku4, i.e., the encryption key set in association with the CPS unit 4, is obtained for decoding.

With this setting, the usage of individual units of content is controlled in different ways. In order to individually manage the usage of individual content management units (CPS units), content usage control information (CCI) for each content management unit (CPS unit) is set, so that the usage of each CPS unit can be controlled according to the associated content usage control information (CCI).

Figure 4:
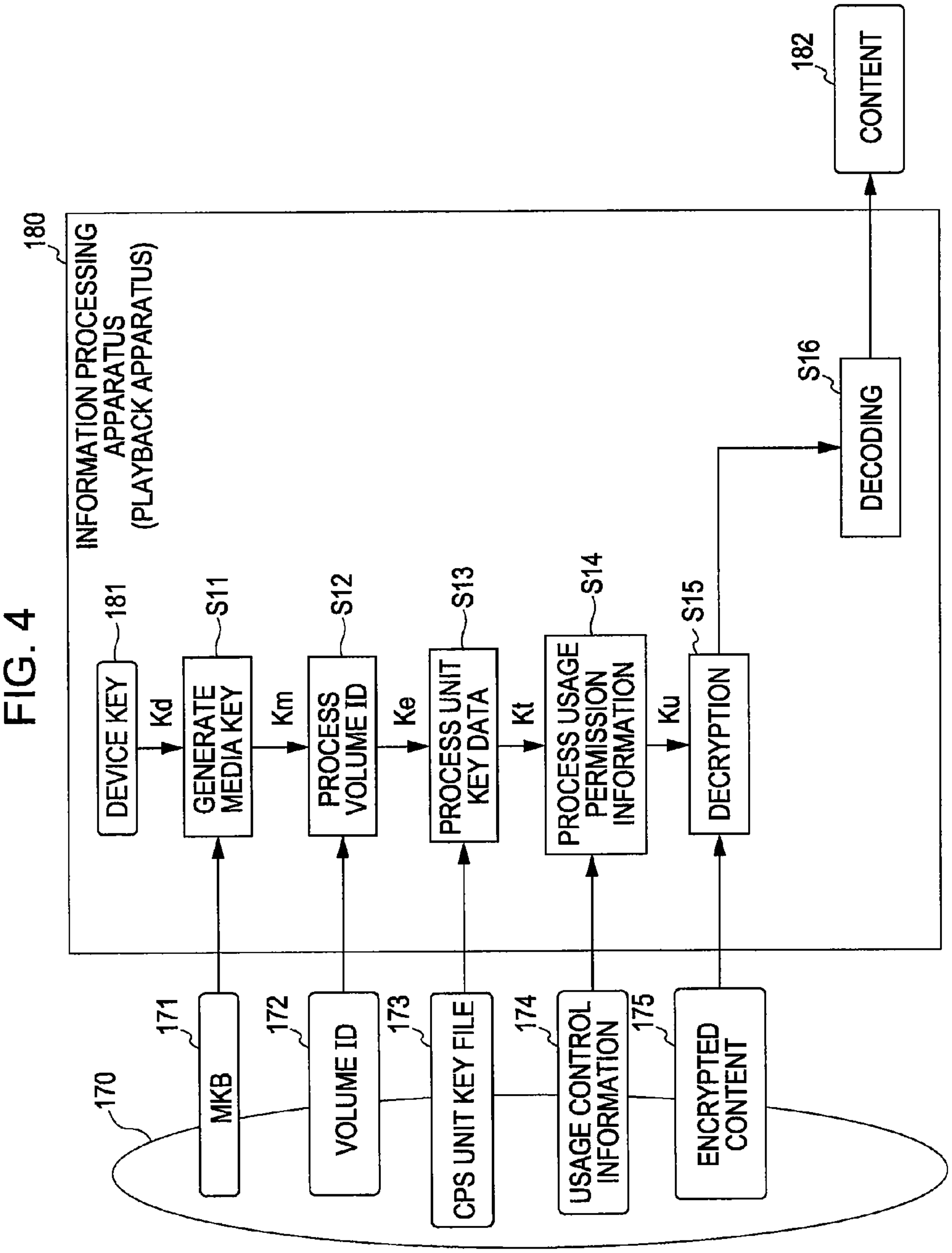
FIG. 4 is a diagram showing a playback sequence of content recorded as a content management unit (CPS unit)

A process of playing back and using content on an information recording medium having recorded thereon content that is managed according to the scheme based on content management units (CPS units) will be described with reference to FIG. 4. First, an information processing apparatus 180 reads a device key [Kd] 181 stored in a memory. The device key 181 is a secret key stored in an information processing apparatus having received a license for usage of content.

Then, in step S11, the information processing apparatus 180 decodes an MKB (Media Key Block) 171 using the device key 181 to obtain a media key Km. The MKB 171 is an encryption key block storing the media key Km and stored on an information recording medium 170. The MKB 171 is an encryption key block that is generated according to a tree-structure key distribution scheme known as a type of broadcast encryption. The MKB 171 is a key information block that allows a media key [Km] used for decoding of content to be obtained only through decoding with a device key [Kd] stored in an information processing apparatus of a user having a valid license. This is implemented by an information distribution scheme based on a hierarchical tree structure. A user device (information processing apparatus) is allowed to obtain the media key [Km] only when the user device has a valid license, and a revoked user device is not allowed to obtain the media key [Km].

Then, in step S12, a volume-specific key Ke is generated by encryption based on the media key Km obtained through the MKB processing in step S11 and a volume ID 172 read from the information recording medium 170. The key generation is executed according to, for example, the AES encryption algorithm.

Then, in step S13, a CPS unit key file 173 read from the information recording medium 170 is decoded using the volume-specific key Ke. The CPS unit key file 173 is a file storing encrypted data of unit keys [Ku_n] that are set in association with individual CPS units. The specific structure of the CPS unit key file 173 will be described later. For example, unit keys are stored in the form of encrypted data, such as [Enc (Ke, f(Ku_n, CCI))]. Enc(a, b) denotes encrypted data generated by encrypting data b using a key a.

Through the decoding of the CPS unit key file 173 in step S13, data [Kt]=f(Ku_n, CCI) is obtained. Then, in step S14, an operation is executed on data [Kt]=f(Ku_n, CCI) using usage control information (CCI) 174 read from the information recording medium 170 to obtain a unit key [Ku_n].

For example, when data [Kt]=f(Ku_n, CCI) is a result of an exclusive-OR (XOR) operation between the unit key [Ku_n] and the usage control information [CCI], the unit key [Ku_n] can be obtained by again executing an exclusive-OR (XOR) operation on the result of operation with the usage control information [CCI] read from the information recording medium 170.

Then, in step S15, a decryption process (e.g., AES_D) of encrypted content 175 read from the information recording medium 170 is executed using the unit key [Ku_n]. In step S16, decoding, such as MPEG decoding, decompression, or descrambling, is executed as needed to obtain content 182.

Through this process, encrypted content that is managed as a CPS unit stored on the information recording medium 170 is decoded so that the content can be used, i.e., so that the content can be played back.

(2.3) Scheme of management based on content management units (CPS units) in a case where cross-playlist editing is allowed Next, a scheme of management based on content management units (CPS units) in a case where a virtual playlist is provided will be described with reference to FIG. 5 and subsequent figures.

Figure 5:
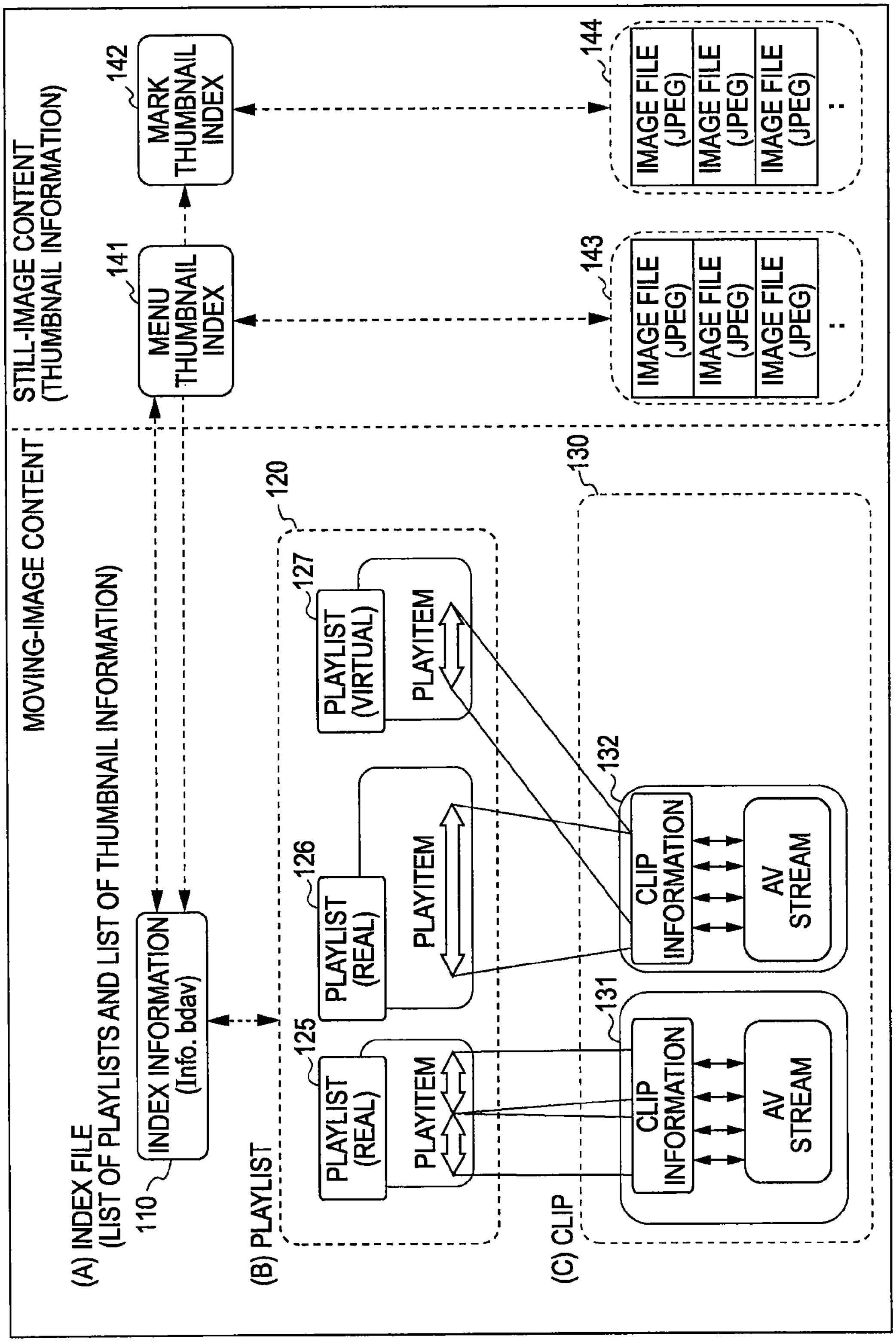
FIG. 5 is a diagram showing a recording format of data stored on an information recording medium, including a virtual playlist.

As shown in FIG. 5, two types of playlist exist. One is real playlists 125 and 126, and the other is a virtual playlist 127. The real playlists 125 and 126 are considered as sharing a clip stream portion they refer to. That is, the playlists 125 and 126 occupy a data volume in a disc corresponding to the clip stream portion they refer to. When an AV stream is recorded as a new clip, a real playlist that refers to the allowable playback range of the entire clip is automatically created. When a portion of the playback range of the real playlists 125 and 126 is deleted, data of a clip stream portion that the deleted portion refers to is also deleted. In contrast, the virtual playlist 127 is considered as not sharing clip data. Even when the virtual playlist 127 is modified or deleted, the clip does not change. That is, the virtual playlist 127 is a playlist that refers to a clip virtually, and can freely refer to an arbitrary clip.

Figure 6:
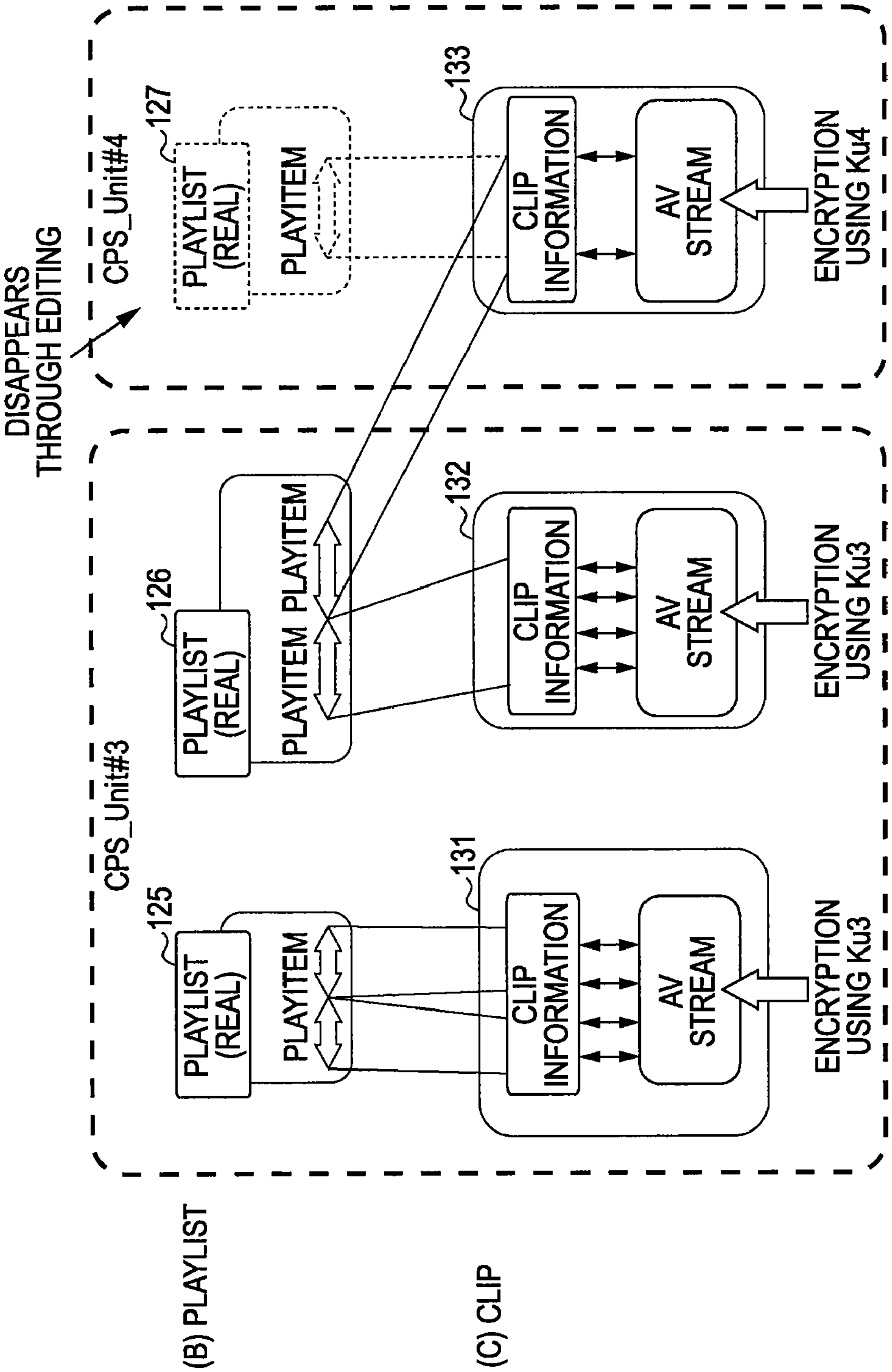
FIG. 6 is a diagram for explaining a problem in setting of content management units (CPS units) corresponding to data including a virtual playlist.

A playlist can refer to different clip stream files. However, when content management units (CPS units) described earlier with reference to FIG. 3 are set, some problems arise. As an example, FIG. 6 shows a result of a combination editing (combining two playlists into a single playlist) of the playlist 126 and the playlist 127 from the state shown in FIG. 3. Through the combination editing, the playlist 127 becomes absent, and a single CPS unit 3 including the real playlists 125 and 126 associated with moving-image content is set. However, since the real playlist 126 refers to a clip originally included in the CPS unit 4 as well as a clip included in the CPS unit 3, of a clip AV stream that is to be played back according to the playlist 126, it is not possible to specify an encryption key (Ku4) for the portion of the clip 133.

Figure 7:
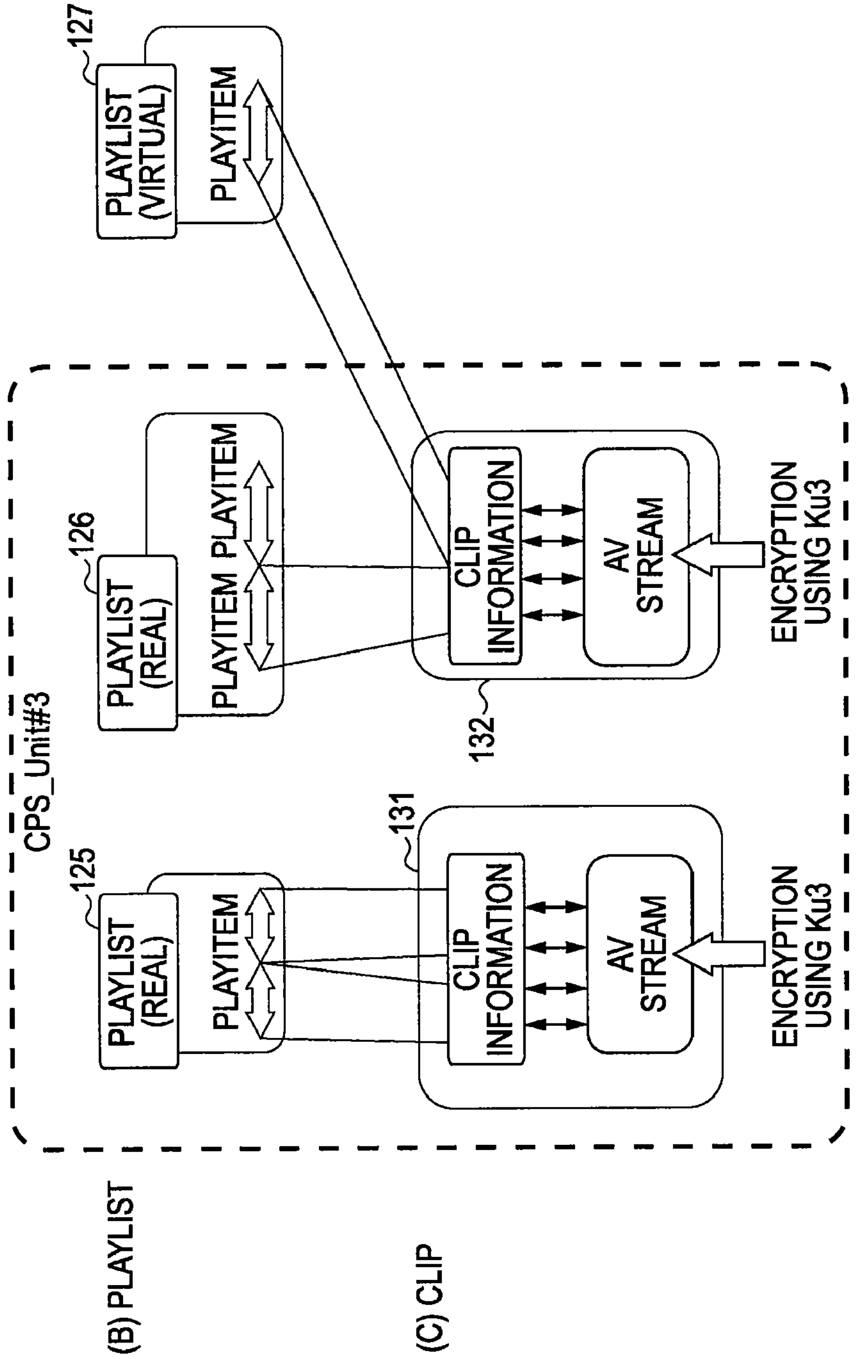
FIG. 7 is a diagram showing an example of setting of content management units (CPS units)

Now, an example scheme for solving this problem will be described. FIG. 7 shows an example scheme for solving this problem, in which content management units (CPS units) are set under the following condition.

Condition 1: Combination editing of real playlists is prohibited (i.e., reference to a clip belonging to different CPS units is prohibited).

The above condition dictates that a real playlist refers only to a clip set in a CPS unit that the real playlist belongs to. According to this scheme, CPS units can be assigned and CPS units can be recognized on the basis of a playlist without causing inconsistencies in editing operations. As for a virtual playlist, CPS units are not assigned, so that the flexibility of editing of the virtual playlist is enhanced. Virtual playlists are disclosed in detail in Japanese Unexamined Patent Application Publication No. 2002-158974.

Figure 8:
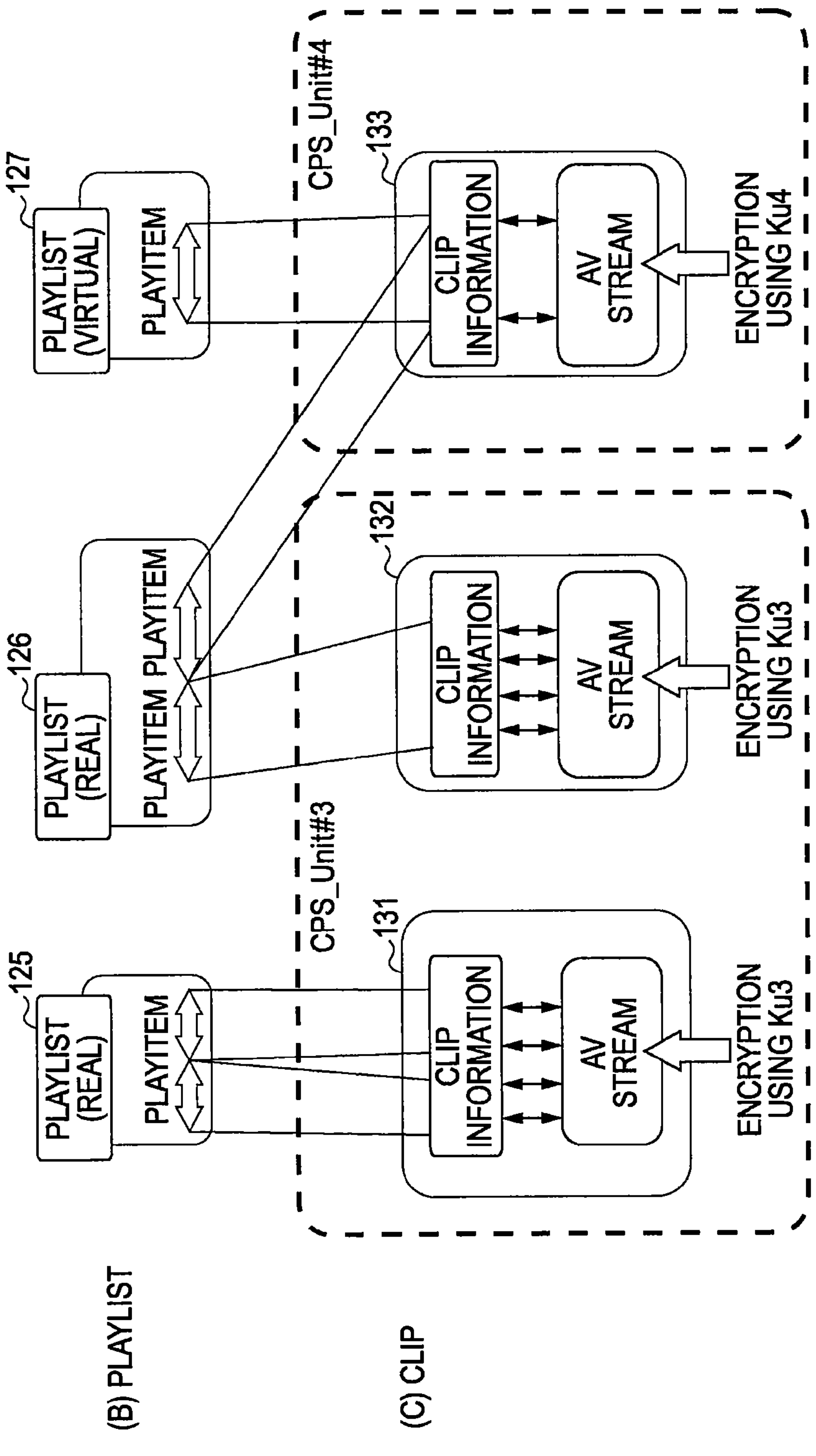
FIG. 8 is a diagram showing an example of setting of content management units (CPS units)

FIG. 8 shows an example scheme in which CPS units are set on a basis of clips. According to the scheme shown in FIG. 8, a CPS unit 3 includes clips 131 and 132, and a CPS unit 4 includes a clip 133. A playlist is defined as data not belonging to any CPS unit.

Since the playlist is independent of CPS units in the scheme described above, the association between CPS units and encrypted data is not affected in editing that is executed in the playlist layer, so that flexible editing is allowed.

Figure 9:
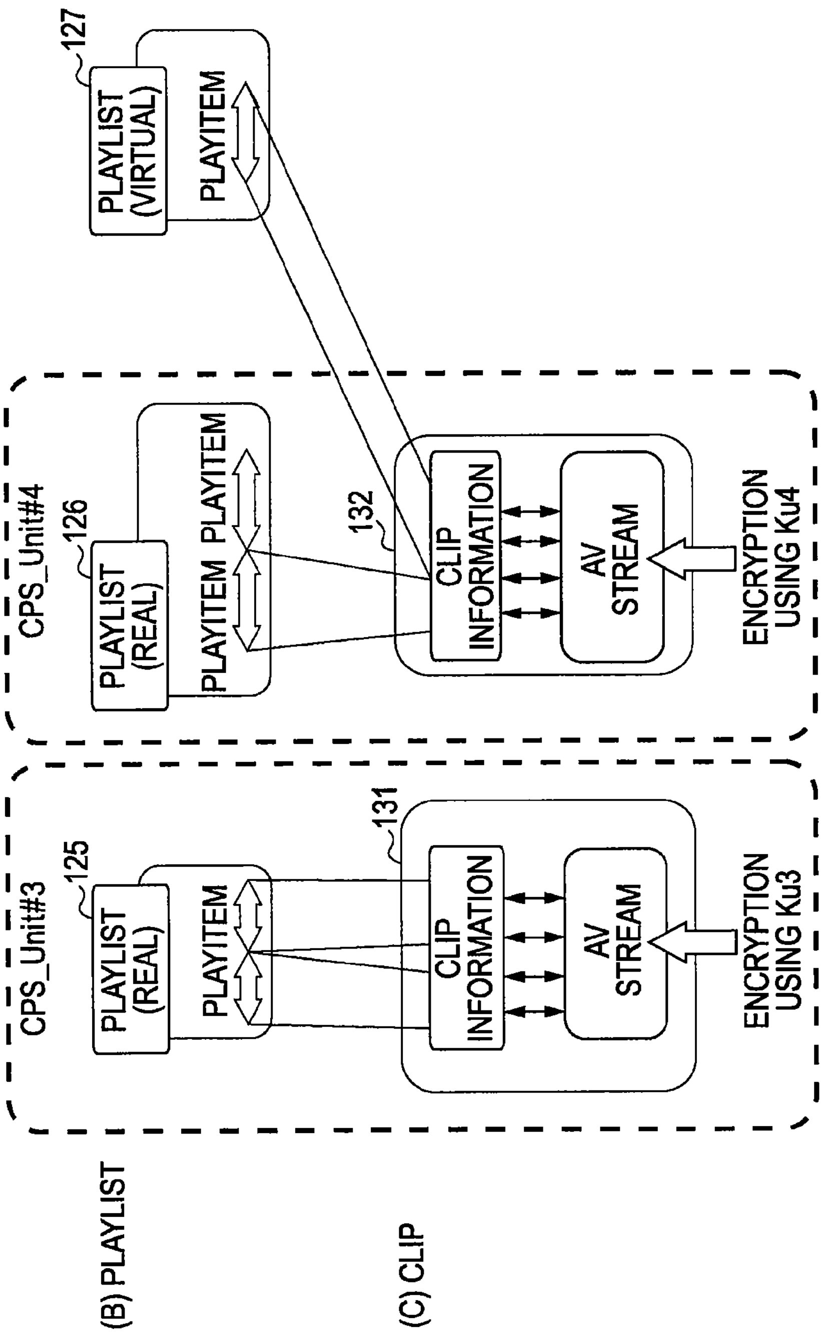
FIG. 9 is a diagram showing an example of setting of content management units (CPS units)

FIG. 9 shows an example scheme in which one CPS unit is assigned to one real playlist. In this case, one-to-one association between playlists and CPS units is ensured. Thus, complex description regarding association between playlists and CPS units is not needed in management information of the playlist. This management scheme is a simple scheme in which one unit key is set for each playlist.

Figure 10:
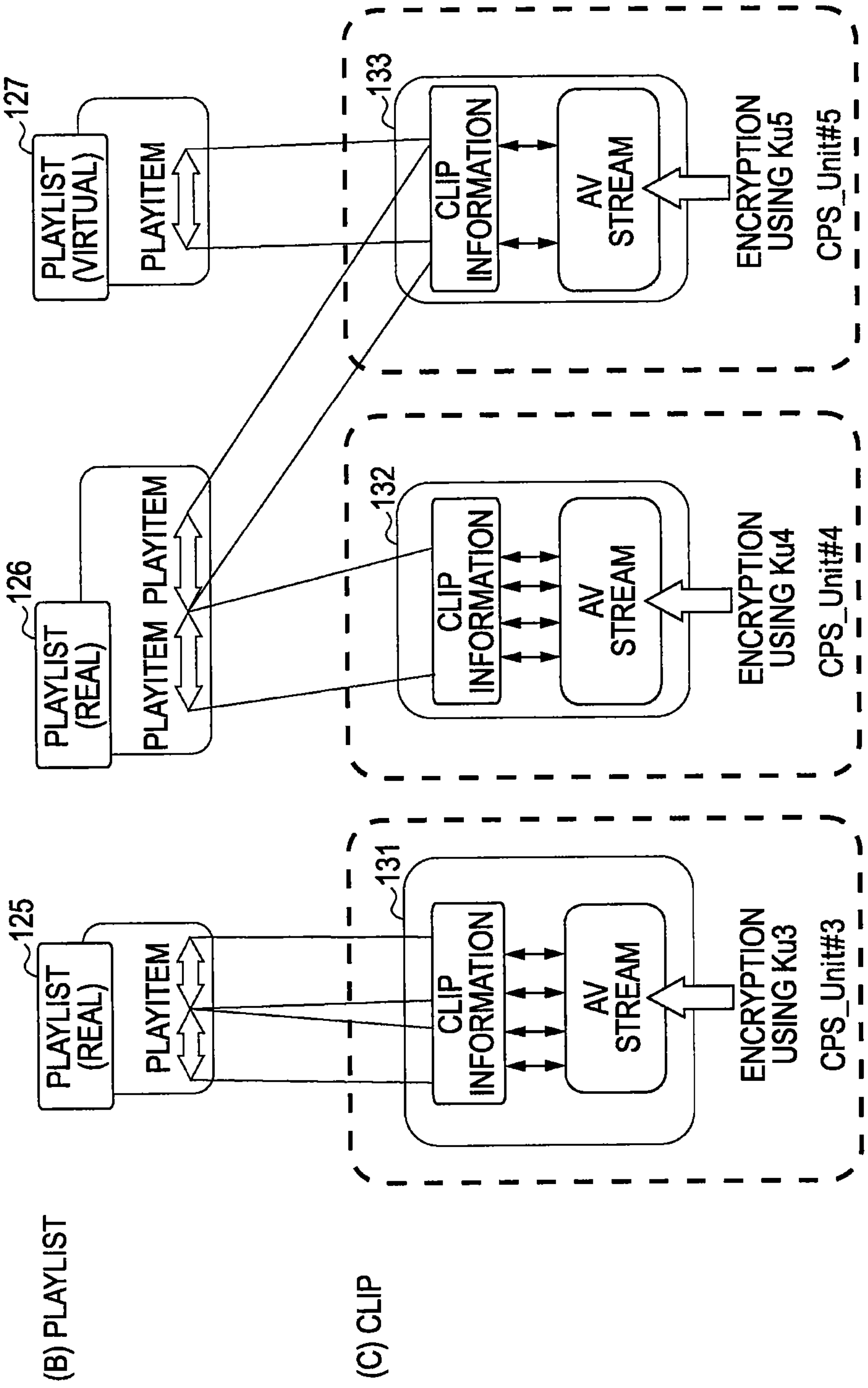
FIG. 10 is a diagram showing an example of setting of content management units (CPS units)

FIG. 10 shows an example scheme in which one CPS unit is assigned to one clip. In this case, one-to-one association between clips and CPS units is ensured. Thus, complex description regarding association between clips and CPS units is not needed in management information of the playlist. This management scheme is a simple scheme in which one unit key is set for each clip.

Figure 11:
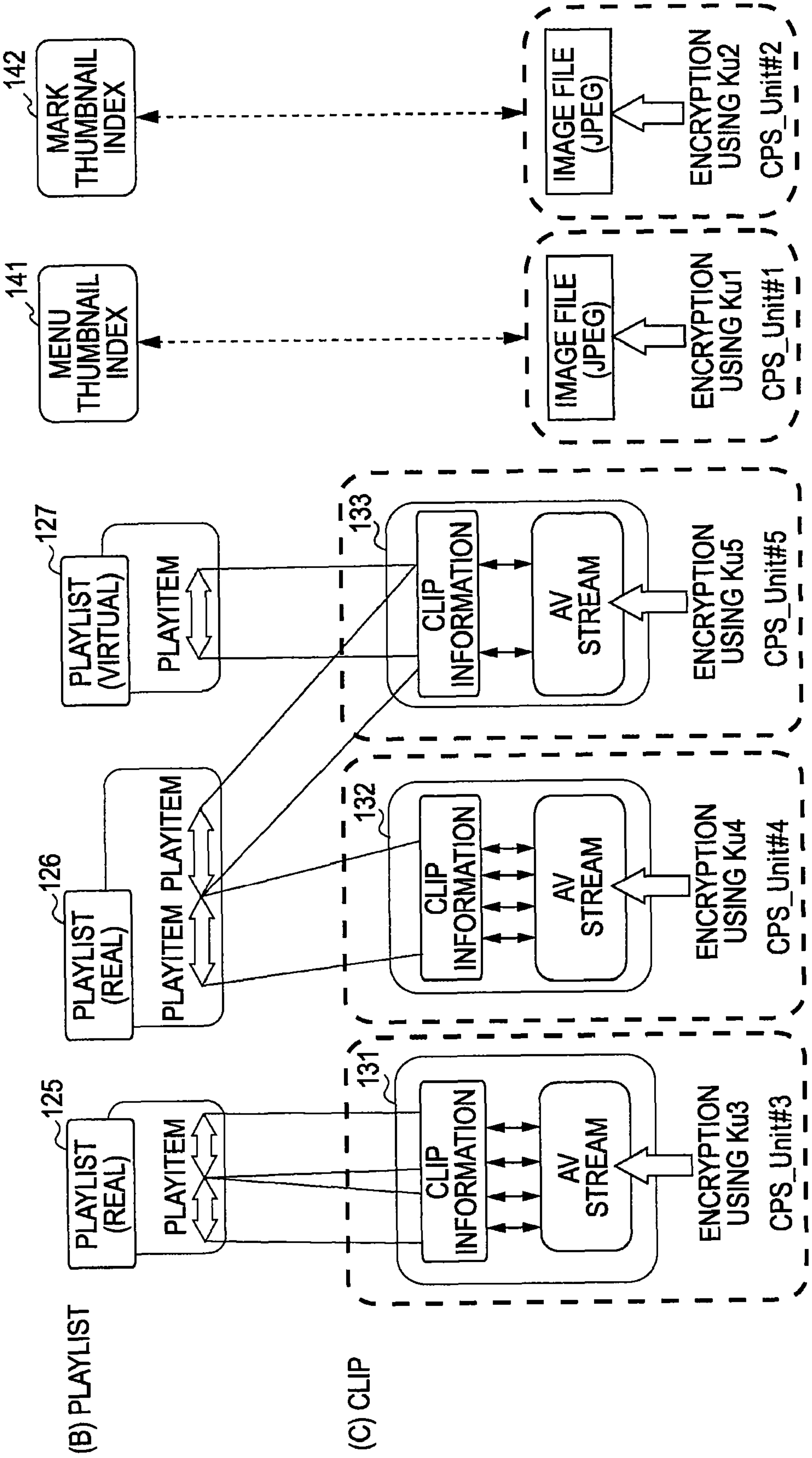
FIG. 11 is a diagram showing an example of setting of content management units (CPS units)

FIG. 11 shows an example scheme in which one CPS unit is assigned to one clip, similarly to the example scheme shown in FIG. 10. In the example scheme shown in FIG. 11, a CPS unit is also set in association with an image file of actual data of still-image content. Also in this case, one-to-one association between clips and CPS units is ensured, and complex description regarding association between clips and CPS units is not needed in management information of the playlist. This management scheme is a simple scheme in which one unit key is set for each clip.

3. Structure of Unit Key File

Next, a plurality of example structures of a unit key file storing a unit key [K_un] that is set in association with a content management unit (CPS unit) stored on an information recording medium will be described.

Figure 12A:
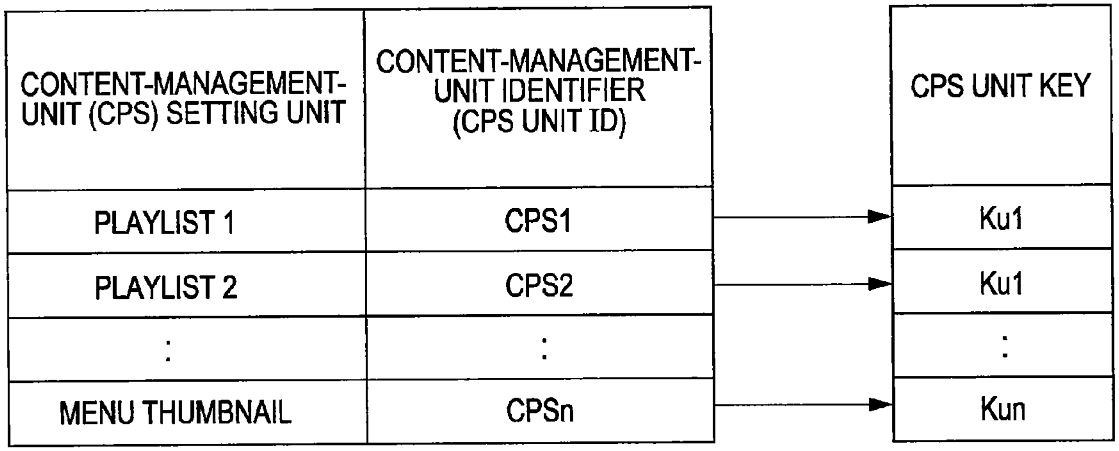
FIGS. 12A and 12B are diagrams showing association between content management units (CPS units) and CPS unit keys.
Figure 12B:
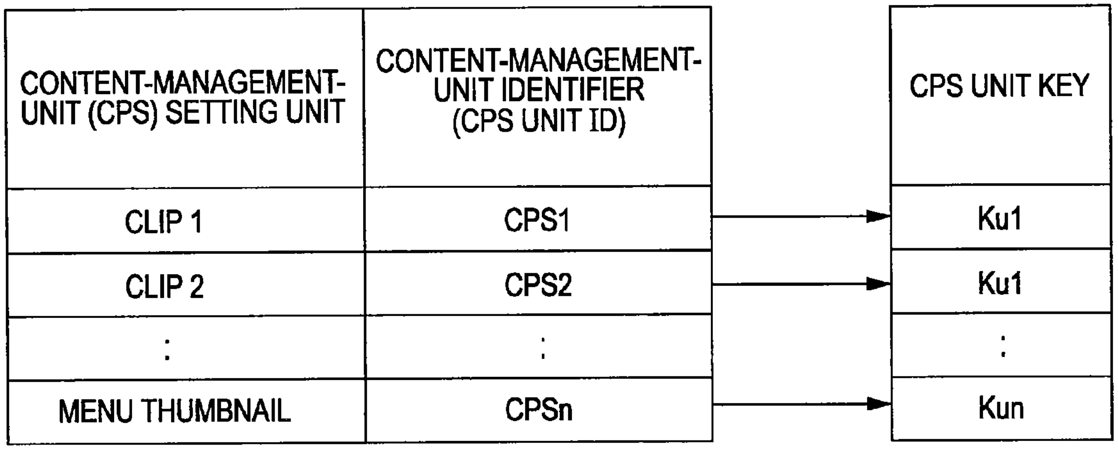

As described earlier, unit keys used for encryption of content are set individually for content management units (CPS units) stored on an information recording medium. The unit keys are stored in a unit key file in an encrypted form. FIGS. 12A and 12B show schemes of setting of CPS unit keys and an example of association of unit keys. FIGS. 12 show units for setting of CPS units as units of usage management of encrypted content stored on an information recording medium, and association of CPS unit keys applied to individual CPS units.

As described earlier, the units for setting of CPS units can be defined in various ways. FIG. 12A shows an example of setting of a unit key file in a case where CPS units are set in association with playlists.

FIG. 12B shows an example of setting of unit keys in a case where CPS units are set in association with clips. This example is an example of setting of a unit key file associated with the schemes of setting of CPS units described earlier with reference to FIGS. 10 and 11.

FIGS. 12A and 12B show examples for explaining structures of a CPS unit key file. An example of data structure of an actual CPS unit key file will be described with reference to FIG. 13 and subsequent figures.

FIG. 13 is a diagram showing a syntax corresponding to an example of the structure of a CPS unit key file. As shown in FIG. 13, a CPS unit key file includes a unit key file header 201 storing header information, and a unit key block 202 storing encrypted data of unit keys. Before the unit key file header 201, a start address of the unit key block 202 (Unit_Key_Block_start_address) is set.

FIGS. 14A and 14B show details of the unit key file header 201 and the unit key block 202. FIG. 14A shows details of the unit key file header 201, and FIG. 14B shows a syntax representing details of the unit key block 202. The CPS unit key file shown in FIGS. 13 and 14A and 14B shows the structure of a CPS unit key file in a case where CPS units are set in association with clips, and it is an example of setting of a unit key file associated with the schemes of setting of CPS units described earlier with reference to FIGS. 10 and 11. Also, the CPS unit key file corresponds to the structure of a unit key file shown in FIG. 12B.

As shown in FIG. 14A, the header portion of a CPS unit key file includes the following items of data:

(1) Application type (Application_Type): Identification information of an application format (e.g., 1 in the case of a playback-only disc format (BDMV) and 2 in the case of a recording/playback disc format (BDAV)). A recording/playback disc allows recording in the format of a playback-only disc. In that case, the application type is recorded as the playback-only disc format (BDMV). The BDMV is basically a format for playback only, and does not include specifications regarding editing of content. However, as will be described with reference to FIG. 16, for example, it is possible to obtain data later by executing various programs using Movie_Object as a program file. In contrast, the BDAV format is a recording format, and it includes specifications regarding editing. The virtual playlist and related matters described earlier are defined for continuous playback at connection points of editing, and these specifications exist only in BDAV.

(2) Number of directories (Num_of_BD_Directory): Number of directories (Always 1 in the case of a playback-only disc (BDMV) and 1 to 5 in the case of a recording/playback disc (BDAV)).

(3) CPS unit number for menu thumbnail #1 (CPS_Unit_number for Menu Thumbnail#I): CPS unit number for a menu thumbnail.

(4) CPS unit number for mark thumbnail #1 (CPS_Unit_number for Mark Thumbnail#I): CPS unit number for a mark thumbnail.

(5) Number of clips in directory I (Num of Clip#I): Number of clips set in a directory I.

(6) ID#J of a clip set in directory I (Clip_ID#J in Directory #I): ID of clip (5-digit decimal number corresponding to XXXXX of a file name XXXXX.clpi).

This data need not necessarily be set in the case of a playback-only disc (BDMV).

(7) CPS unit number associated with directory #I and title #J (CPS_Unit_number for Title#J in Directory #I): CPS unit number associated with a title) of a clip. The title is a logical unit for the user to recognize one playback group, and includes one or more clips.

These items of data are stored as header information. In the unit key file having the structure shown in FIGS. 13 and 14A and 14B, a CPS unit number is associated with each menu thumbnail, a CPS unit number is associated with each mark thumbnail, and a CPS unit number is associated with each clip in each directory.

The unit key block of the CPS unit key file shown in FIG. 14B includes the following items of data:

(1) Number of CPS units (Num_of_CPS_Unit): Number of CPS units on disc.

(2) MAC of usage control information (MAC of Usage Rules#I): MAC (Message Authentication Code) value as integrity checking data of usage control information (CCI) file data associated with a CPS unit.

(3) MAC of media ID (MAC of Media ID#I): MAC value as integrity checking data of media ID [MediaID (serial number of a recording disc)].

(4) Encrypted CPS unit key for each CPS (Encrypted CPS Unit Key for CPS Unit#I): Encrypted data of a unit key assigned to a CPS unit.

Between the BDMV format in the case where the information recording medium is a playback-only disc (BDMV) and the BDAV format in the case where the information recording medium is a recording/playback disc (BDAV), the directory structure used by an application that executes recording or playback of data differs. The structure of the CPS unit key file shown in FIGS. 13 and 14A and 14B can be used with either disc or by either application. The data structure of the CPS unit key file shown in FIGS. 13 and 14 is only an example, and the constituent data can be changed to a certain extent as needed. For example, as described earlier, in the unit key file header shown in FIG. 14A, (6) ID#J of a clip set in directory I (Clip_ID#J in Directory #I): ID of a clip (5-digit decimal number corresponding to XXXXX of a file name XXXXX.clpi) need not necessarily be set in the case of a playback-only disc (BDMV). This is because, in the case of BDMV, which is a video format for playback, since editing need not be considered, it suffices to exercise management on the basis of a title, which is a logical unit for the user to recognize one playback group. (That is, management is exercised using CPS_Unit_number for Title#J in Directory#I). In contrast, in the case of BDAV, which is a video format for recording, when management is exercised on the basis of a title, which is a logical unit for the user to recognize one playback group (e.g., the setting shown in FIG. 7), flexible editing by the user could be inhibited. Thus, management is exercised on the basis of each clip, which is a file storing an actual AV stream encoded according to MPEG2, AVC, VC1, or the like (e.g., the setting shown in FIG. 8). (That is, management is exercised using Clip_ID#J in Directory #I). As described above, by using Application_Type, CPS unit key files of substantially the same structure are used individually for BDMV, which is a format for playback, and BDAV, which is a format for recording. Thus, it is possible to reduce the load of a playback apparatus while exercising suitable content management for the individual formats.

Figure 15:
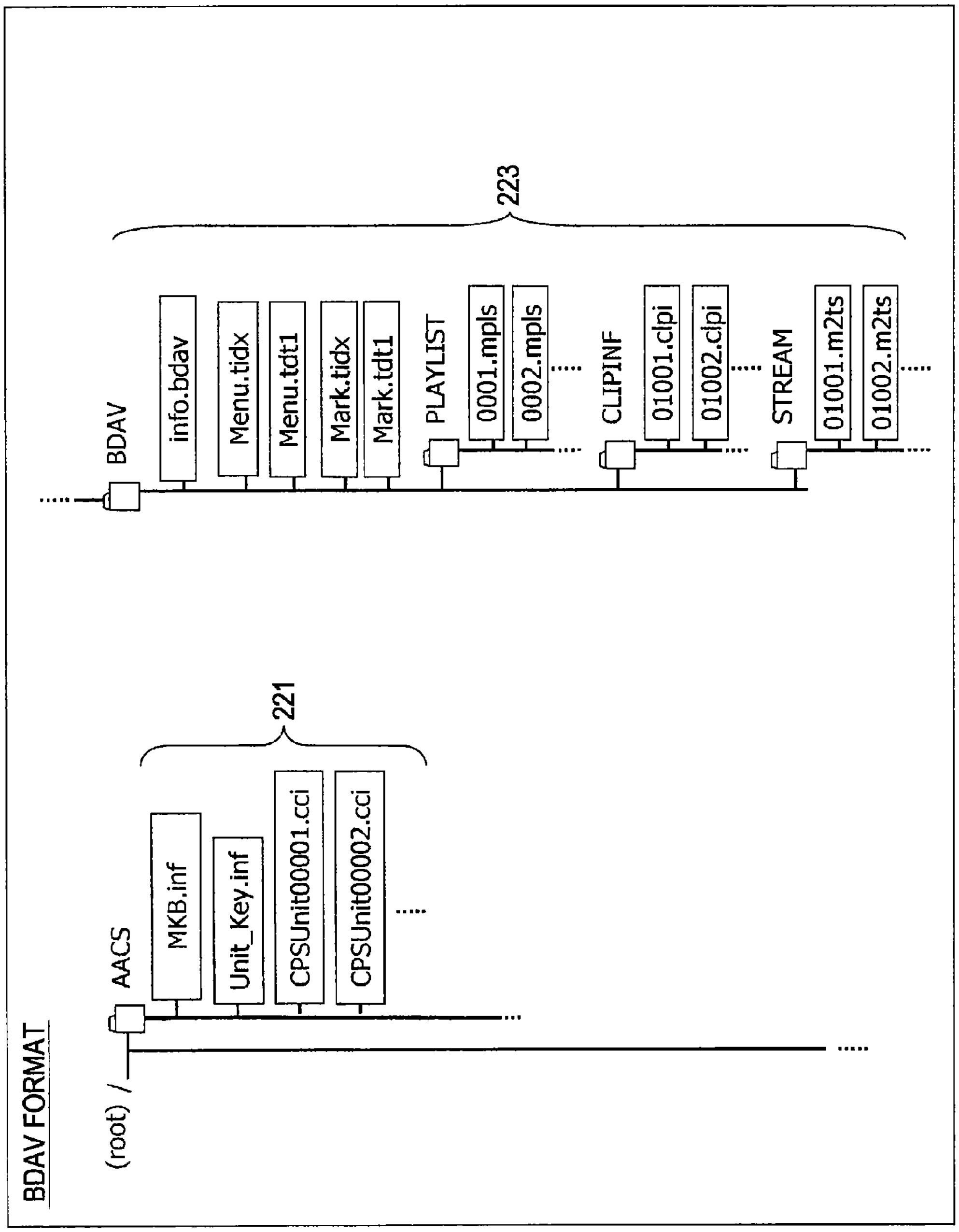
FIG. 15 is a diagram showing a directory structure corresponding to the BDAV format in a case where a recording and playback disc (BDAV) is used as an information recording medium.
Figure 16:
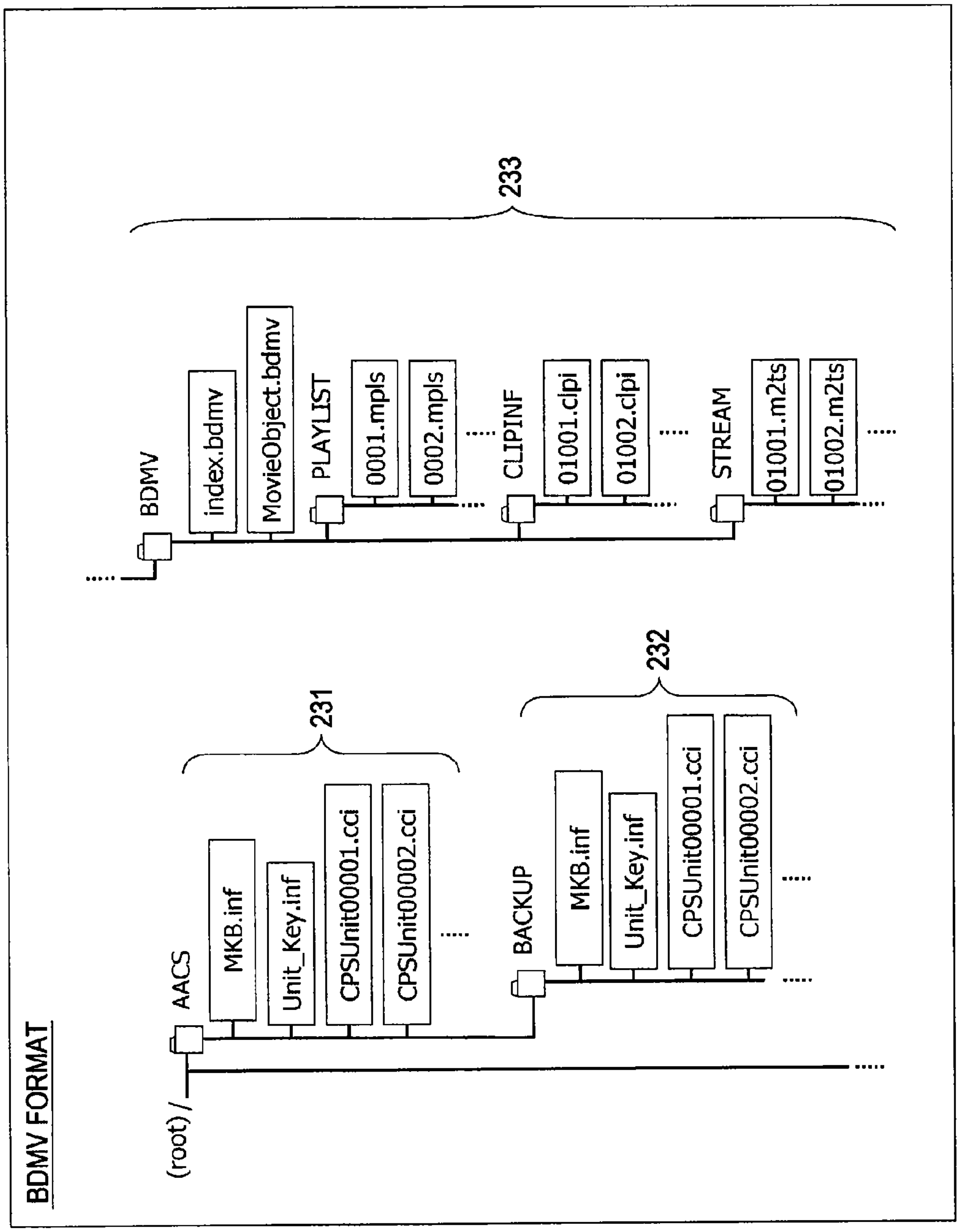
FIG. 16 is a diagram showing a directory structure corresponding to the BDMV format in a case where a playback-only disc (BDMV) is used as an information recording medium.

FIGS. 15 and 16 show a directory structure for the BDAV format in a case where an information recording medium is a recording/playback disc (BDAV) and a directory structure for the BDMV format in a case where an information recording medium is a playback-only disc (BDMV).

FIG. 15 shows a directory structure for the BDAV format. A data portion 221 is stores various types of additional information or control information, in which the MKB serving as an encryption key block described earlier, the unit key file described earlier, and content usage control information (CCI: Copy Control Information) associated with each CPS unit are set.

In a data portion 223, data according to the BDAV format is set, such as index information (info.bdav), menu thumbnails (Menu.tidx, Menu.tidx1) and mark thumbnails (Mark.tidx, Mark.tidx1) constituting still-image content, playlists (0001.mpls, etc. in PLAYLIST), clips (01001.clpi, etc. in CLIPINF), and stream data files (01001.m2ts, etc. in STREAM) constituting moving-image content, described earlier with reference to FIG. 1.

FIG. 16 shows a directory structure for the BDMV format. A data portion 231 is stores various types of additional information and control information, in which the MKB serving as an encryption key block described earlier, the unit key file described earlier, and content usage control information (CCI: Copy Control Information) associated with each CPS unit are set.

In a data portion 232, a backup data file of data set in the data portion 231 is set. The backup data file is not necessary and is set as needed. In a data portion 233, data according to the BDMV format is set. In the BDAV format, a movie object (MovieObject) that serves as a program file is set. Furthermore, similarly to the BDAV format, playlists, clips, and stream data files constituting moving-image content are set.

The CPS unit key file described with reference to FIGS. 13 and 14 can be used either in both BDAV format and BDMV format shown in FIGS. 15 and 16, and the CPS unit key file can be used as a common key file for both formats.

An application that uses an information recording medium, executed by an information processing apparatus, checks with reference to the application type (Application_Type) of the header portion of the CPS unit key file shown in FIG. 14A whether the key file has a setting according to either BDMV or BDAV, and obtains a key that is to be used from the key block shown in FIG. 14B.

In the structure of the unit key file described with reference to FIGS. 13 and 14, as described earlier, each menu thumbnail is associated with a CPS unit number, each mark thumbnail is associated with a CPS unit number, and each clip in each directory is associated with a CPS unit number.

For example, when an application program of an information processing apparatus that executes playback of content obtains a unit key that is used for decoding of content, a thumbnail or a clip as content to be played back is identified, a CPS unit number associated with the thumbnail or the clip is obtained from the CPS unit key file header shown in FIG. 14A, and a unit key associated with the CPS unit number is obtained from the CPS unit key block shown in FIG. 14B.

Next, various examples of setting of a unit key file will be described with reference to FIG. 17 and subsequent figures.

(1) First Example of Setting of CPS Units in Association with Playlists

FIG. 17 shows the structure of a unit key file in a case where CPS units are set in association with playlists. In the CPS unit key file shown in FIG. 17, CPS unit numbers associated with menu thumbnails, mark thumbnails, and playlists #1 to #np are recorded in a CPS unit key file header 301, and encrypted unit keys associated with the individual CPS unit numbers are stored in a CPS unit key block 302. This CPS unit key file can be used in association with the example of setting of CPS units described earlier with reference to FIGS. 3 and 7.

(2) Second Example of Setting of CPS Units in Association with Playlists

FIG. 18 also shows the structure of a unit key file in a case where CPS units are set in association with playlists. In the CPS unit key file shown in FIG. 18, in a CPS unit key file header 311, CPS unit numbers associated with menu thumbnails and mark thumbnails are recorded, and as for playlists, playlist IDs are directly written and CPS unit numbers associated with the individual playlist IDs are recorded. In a CPS unit key block 312, encrypted unit keys associated with the individual CPS unit numbers are stored. This CPS unit key file can also be used in association with the example of setting of CPS units described earlier with reference to FIGS. 3 and 7.

(3) First Example of Setting of CPS Units in Association with Clips

FIG. 19 shows the structure of a unit key file in a case where CPS units are set in association with clips. In the CPS unit key file shown in FIG. 19, CPS unit numbers associated with menu thumbnails, mark thumbnails, and clips #1 to #nc are recorded in a CPS unit key file header 321, and encrypted unit keys associated with the individual CPS unit numbers are stored in a CPS unit key block 322. This CPS unit key file can be used in association with the example setting descried earlier with reference to FIG. 8, where CPS units are set in association with clips.

(4) Second Example of Setting of CPS Units in Association with Clips

FIG. 20 also shows the structure of a unit key file in a case where CPS units are set in association with clips. In the CPS unit key file shown in FIG. 20, in a CPS unit key file header 331, CPS unit numbers associated with menu thumbnails and mark thumbnails are recorded, and as for clips, clip IDs are written directly and CPS unit numbers associated with the individual clip IDs are recorded. In a CPS unit key block 332, encrypted unit keys associated with individual CPS unit numbers are stored. This CPS unit key file can also be used in association with the example setting described earlier with reference to FIG. 8, where CPS units are set in association with clips.

(5) First Example of Setting one CPS Unit for One Playlist

FIG. 21 shows the structure of a unit key file in a case where CPS units are set in association with playlists. In the CPS unit key file shown in FIG. 21, header information representing CPS unit numbers associated with playlists is not included, and only a CPS unit key block 341 storing encrypted unit keys associated with menu thumbnails, mark thumbnails, and playlists #1 to #np is set. Since a CPS unit key is set in association with a single playlist, CPS unit numbers associated with individual playlists need not be recorded, so that the file structure is simplified. This CPS unit key file can be used in association with the example setting described earlier with reference to FIG. 9, where CPS units are set in association with playlists.

(6) Second Example of Setting One CPS Unit for One Playlist

FIG. 22 also shows the structure of a unit key file in a case where CPS units are set in association with playlists. In the CPS unit key file shown in FIG. 22, CPS unit numbers associated with playlists are not included, and only a CPS unit key block 351 storing encrypted unit keys associated with menu thumbnails, mark thumbnails, and playlist IDs is set. Since a CPS unit key is set in association with a single playlist, CPS unit numbers associated with individual playlists need not be recorded, so that the file structure is simplified. This CPS unit key file can also be used in association with the example setting described earlier with reference to FIG. 9, where CPS units are set in association with playlists.

(7) First Example of Setting One CPS Unit for One Clip

FIG. 23 shows the structure of a unit key file in a case where CPS units are set in association with clips. In the CPS unit key file shown in FIG. 23, header information representing CPS unit numbers associated with clips is not included, and only a CPS unit key block 361 storing encrypted unit keys associated with menu thumbnails, mark thumbnails, and clips #1 to #nc is set. Since a CPS unit key is set in association with a single clip, CPS unit numbers associated with individual clips need not be recorded, so that the file structure is simplified. This CPS unit key file can be used in association with the example setting described earlier with reference to FIG. 10, where CPS units are set in association with playlists.

(8) Second Example of Setting One CPS Unit for One Clip

FIG. 24 shows the structure of a unit key file where CPS units are set in association with clips. In the CPS unit key file shown in FIG. 24, header information representing CPS unit numbers associated with clips is not included, and only a CPS unit key block 371 storing encrypted unit keys associated with menu thumbnails, mark thumbnails, and clip IDs is set. Since a CPS unit key is set in association with a single clip, CPS unit numbers associated with individual clips need not be recorded, so that the file structure is simplified. This CPS unit key file can also be used in association with the example setting described earlier with reference to FIG. 10, where CPS units are set in association with playlists.

As described above, various schemes of CPS unit setting are possible, and CPS unit key files may have various structures in accordance with the setting of individual CPS units.

4. Structure of Usage Control Information (CCI)

Next, specific examples of the structure of usage control information (CCI: Copy Control Information) stored on an information recording medium will be described. The usage control information (CCI) includes, for example, the number of times of copying permitted for content belonging to each CPS unit.

In the usage control information (CCI), for example, the following items of information related to content are set:

Copying permission/prohibition information: Information representing whether copying is permitted, prohibited, or only one generation of copying is permitted.

Video-output-resolution regulation information: Information representing whether output regulation is imposed or not.

Analog copying control information: Information representing whether analog copying is permitted or prohibited (Specification of analog copying protection technology used).

Encryption information: Information representing whether encryption is executed or not.

Right claim information: Information representing whether right is claimed.

Figure 25:
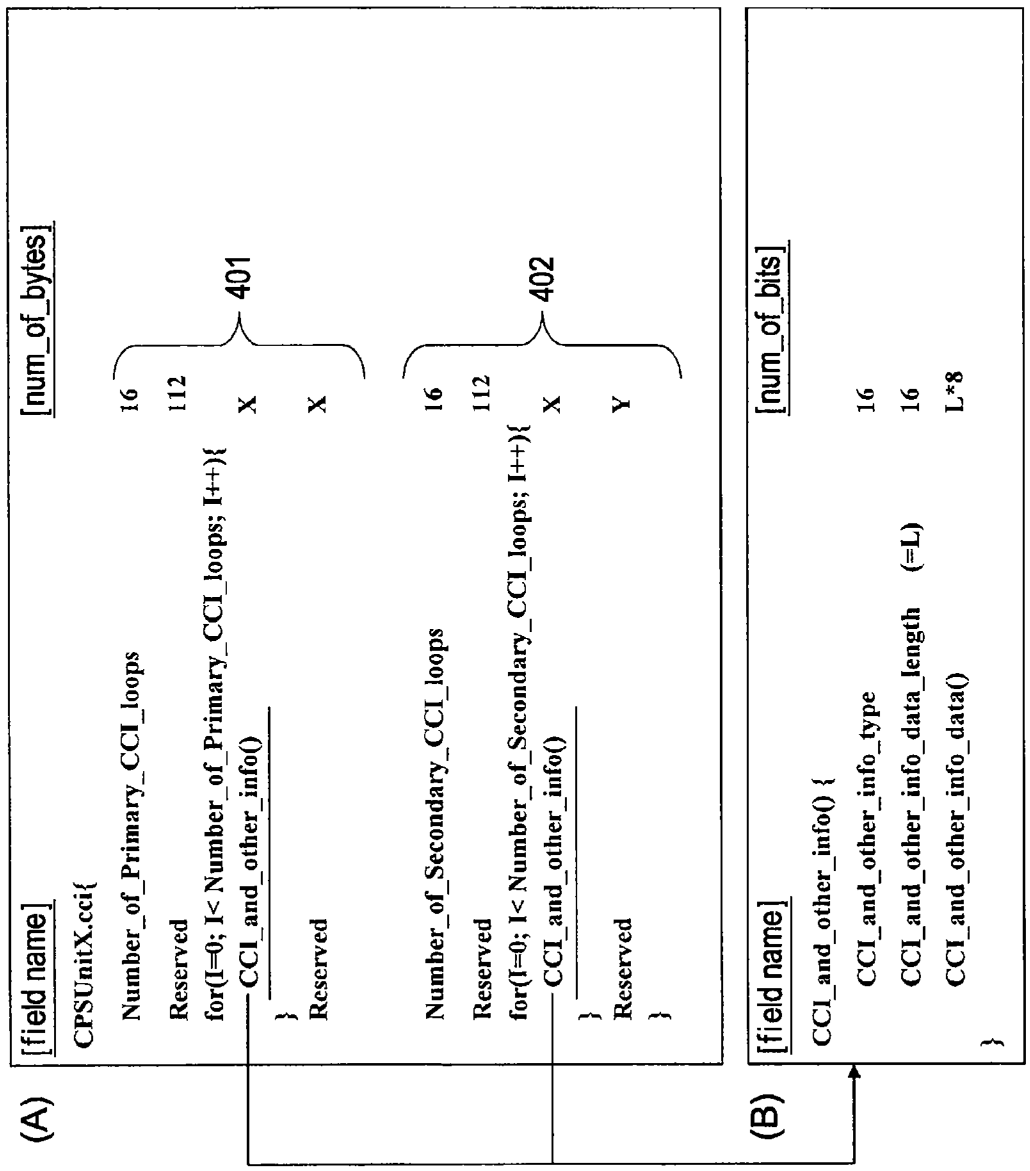
FIG. 25 is a diagram showing an example of the data structure of content usage control information (CCI)

The above is an example of information constituting usage control information (CCI), and various other types of information can be set. FIG. 25 shows an example of the structure of a usage control information (CCI) file.

In FIG. 25, part (A) shows the overall structure of usage control information (CCI), and part (B) shows a detailed structure of a playback/copy control information storage block [CCI_and_other_info]. As shown in part (A) of FIG. 25, content usage control information includes first block area data 401 and subsequent block area data 402.

In the first block area data 401, header information is set, including [Number_of_Primary_CCI_loop] representing the number of information blocks (loops) constituting content usage control information (CCI) written in the first block, and a reserved area [reserved].

Furthermore, as shown in part (B) of FIG. 25, in the first control information (CCI) area information, [CCI_and_other_info_type] (16 bits) representing a data type of content usage control information (CCI), [CCI_and_other_info_data_length] (16 bits) representing a data length of content usage control information (CCI), and [CCI_and_other_info_data] (CCI_and_other_info_data_length×8 bits) representing data values of content usage control information (CCI) are set. Furthermore, a reserved area [reserved] (X bits) is set.

The data structure in the subsequent block area data 402 is substantially the same as that in the first block area. That is, the subsequent block area data 402 includes a header including information representing the number of loops and including a reserved area, a content usage control information (CCI) portion including a data type, a data length, and data values, and a reserved area.

Figure 26:
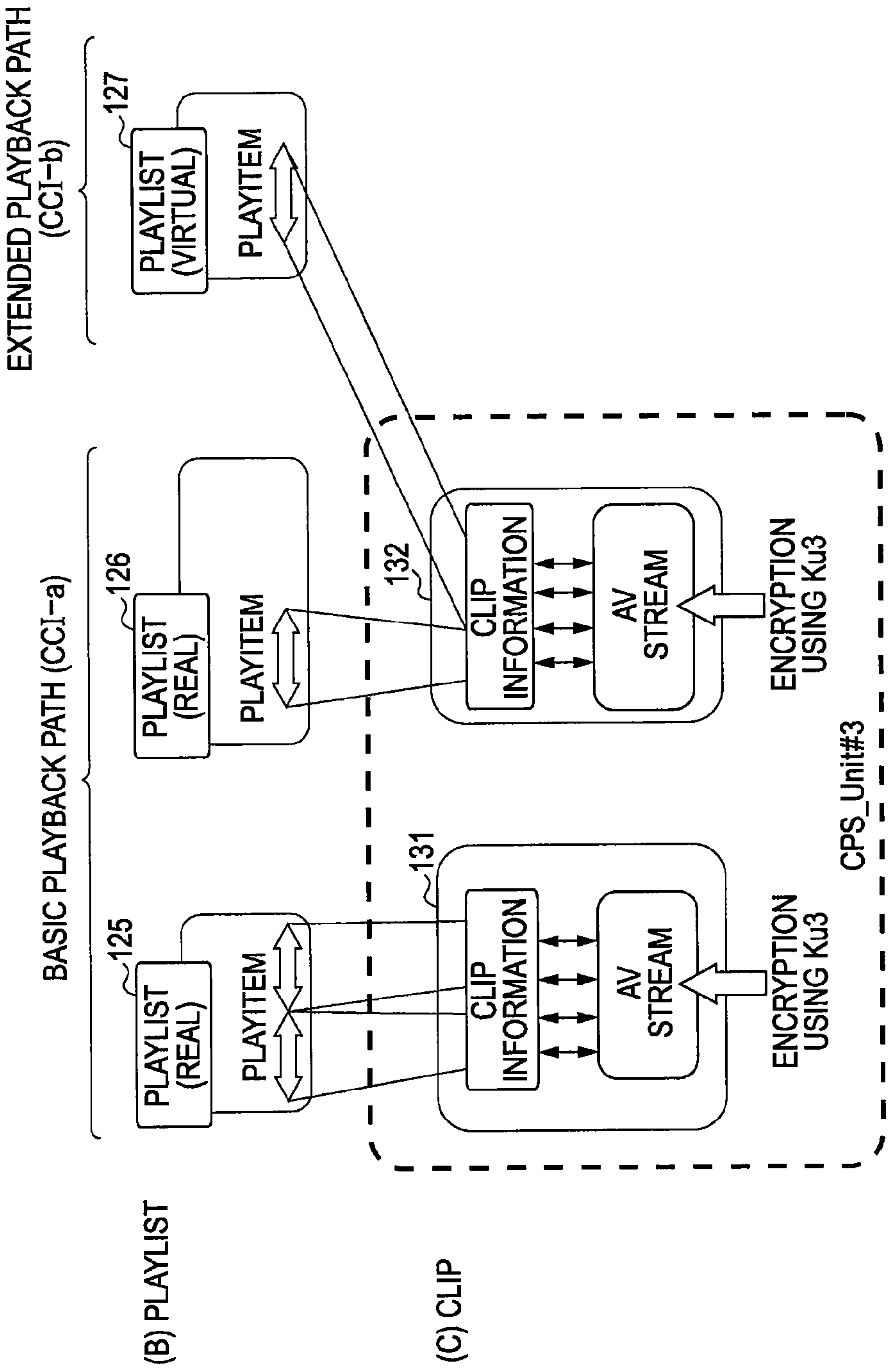
FIG. 26 is a diagram showing an example of usage of content usage control information (CCI) for controlling usage in different modes in playing back content when playlists applied or titles differ among pieces content belonging to a single CPS unit.

The data structure of usage control information (CCI) shown in FIG. 25 is an example where CCI is set in association with CPS units so that usage of the same CPS unit is controlled uniformly. However, usage of pieces of content belonging to the same CPS unit may be different ways when playlists applied or titles differ. For example, as shown in FIG. 26, when a plurality of playlists 125 to 127 refers to a CPS unit #3, usage control information (CCI) CCI-a is set in association with the playlists 125 and 126, and usage control information (CCI) CCI-b is set in association with the playlist 127.

For example, when content is played back on the basis of the playlist 125 or 126, a basic playback path is used, while content is played back on the basis of the playlist 127, an extended playback path is used. The extended playback path has a CCI setting different from that of the basic playback path, such as "restricted period" or "playback permission required". In the case of such setting, conditions associated with playlists or titles to which usage control information (CCI) set in association with CPS units are applied are recorded distinctly.

Figure 27:
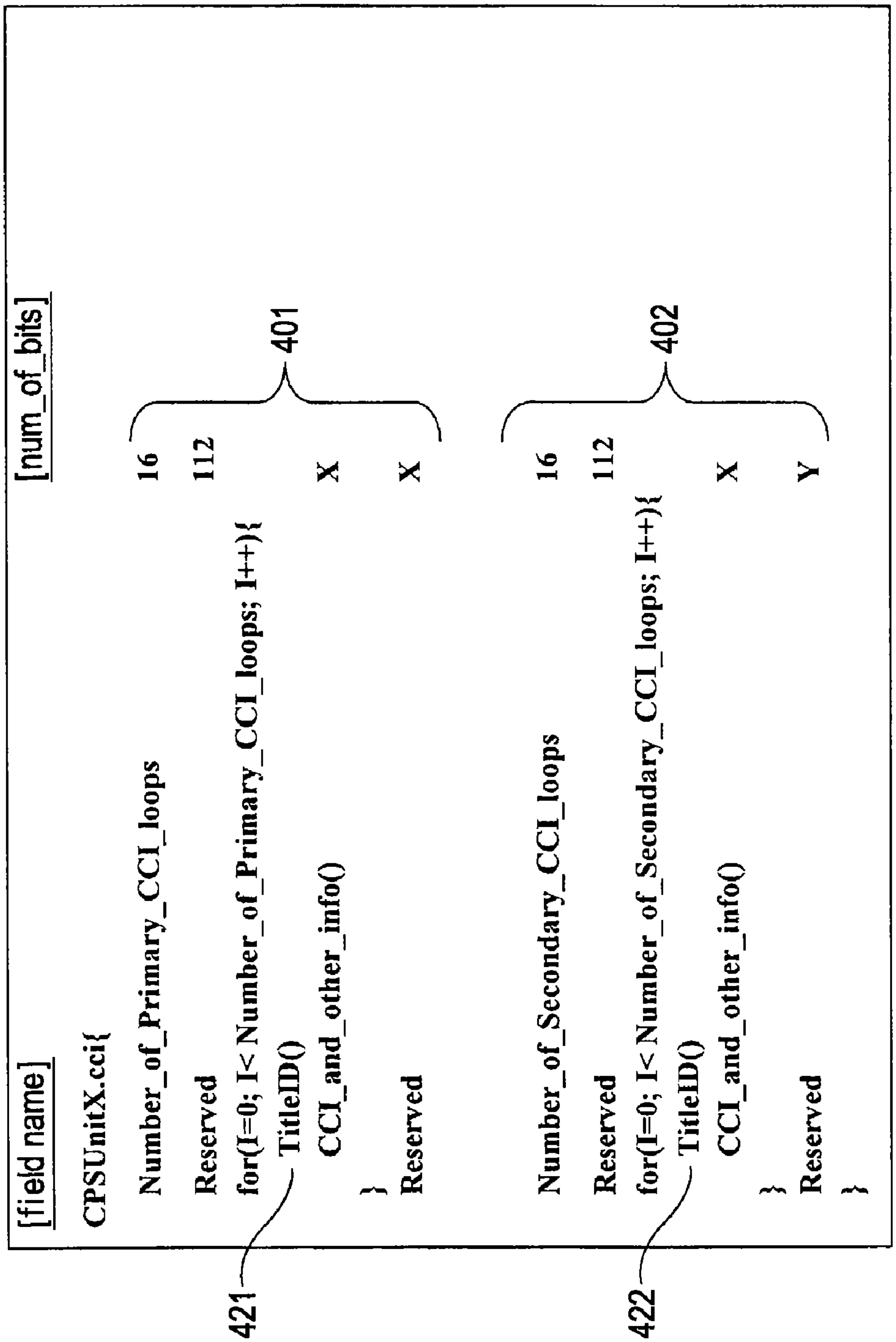
FIG. 27 is a diagram showing an example of the data structure of content usage control information (CCI) having a setting in which different pieces of usage control information (CCI) can be written on a basis of individual title IDs.

More specifically, as shown in FIG. 27, in each of the first block area data 401 and the subsequent block area data 402, a title ID is set before the start of the usage control information (CCI) recording area [CCI_and_other_info], so that different usage control information (CCI) can be written for individual title IDs. Instead of title IDs, playlist IDs or clip IDs can be used in a similar manner, so that usage control information (CCI) associated with a single CPS unit can be set so that usage control in different modes can be written on the basis of titles, playlists, or clips.

An information processing apparatus that executes a playback process identifies a CPS unit to which content that is to be played back belongs, obtains usage control information (CCI) associated with the CPS unit, further obtains IDs of titles, playlists, clips, and the like that are to be used for playback, and reads control information associated with the IDs from a usage control information (CCI) file, so that content can be used under the control of the information that has been read.

Various types of content usage control information (CCI) exist. The type of content usage control information (CCI) is identified on the basis of [CCI_and_other_info_type] representing a data type, as described with reference to part (B) of FIG. 25. The types of usage control information (CCI) will be described with reference to FIG. 28.

For example, the following types of content usage control information (CCI) exist:

(1) Basic CCI for AACS: Most strict CCI information in a clip is recorded.

(2) CCI Sequence Information: Information is recorded for each point of change in CCI in a clip.

Two ways of usage of CCI exist for playback. More specifically, only Basic CCI for AACS, which is the most strict CCI information, is referred to, or CCI Sequence Information, representing change in CCP in a clip, is used. These two types of CCI information will be described later in detail.

In addition to the above two types, for example, the following types of content usage control information (CCI) are set:

(3) Basic Title Usage for AACS: Different usage modes are specified for individual titles.

(4) Key Management Information for Network Transaction: Scheme of key management for network connection (method of key binding, presence or absence of key on disc, etc.) is recorded.

(5) URI Information for Managed Copy: Management information that is used when content on a ROM disc is copied to another recording medium is recorded.

Next, detailed structures of the two types of usage control information (CCI), i.e.:

(1) Basic CCI for AACS: Most strict CCI information in a clip is recorded.

(2) CCI Sequence Information: Information is recorded for each point of change in CCI in a clip.

will be described with reference to FIGS. 29 and 30.

FIG. 29 is a diagram showing an example of the syntax of Basic CCI for AACS. The data structure will be described below.

As data type information [CCI_and_other_info_type] of content usage control information (CCI), identification information representing Basic CCI for AACS (010116) is set. (xxxx16) denotes bit information represented as a hexadecimal number. Furthermore, as data length information [CCI_and_other_info_data_length] of content usage control information (CCI), data representing the length of Basic CCI for AACS (001016) is set.

Furthermore, as data value information [CCI_and_other_info_data] of content usage control information (CCI), the following items of information are stored:

EPN: Information representing whether encryption is executed (encrypted or not encrypted)

CCI: Copy permission or prohibition information (copying permitted, copying prohibited, or only one generation of copying is permitted)

Image_Constraint_Token: Video-output-resolution restriction information (whether output restriction is imposed or not)

APS: Analog copy control information (permitted or prohibited (specification of analog copy preventing technology used))

Next, the data structure of CCI Sequence Information in which information is recorded for each point of change in CCI in a clip will be described with reference to FIG. 30. As opposed to the Basic CCI for AACS described with reference to FIG. 29, the CCI Sequence Information shown in FIG. 30 includes the following items of information:

Number of CCI sequence: Number of blocks having different CCI in a clip (in a CPS unit).

Start SPN for CCI Sequence: Information representing points of change (packet numbers) in CCI information.

For example, when broadcast signals are received and recorded on an information recording medium, content associated with different usage control information (CCI) can be included in broadcast content. For example, a content part A is copy-prohibited content while a content part B is copy-free content.

In the case of such content, information representing points of change in CCI is recorded. CCI Sequence Information is used as usage control information associated with such content.

For example, an information processing apparatus that plays back content obtains CCI Sequence Information to obtain information representing points of change in CCI information, and uses content according to different modes of usage control (CCI) before and after the points of change.

Figure 31:
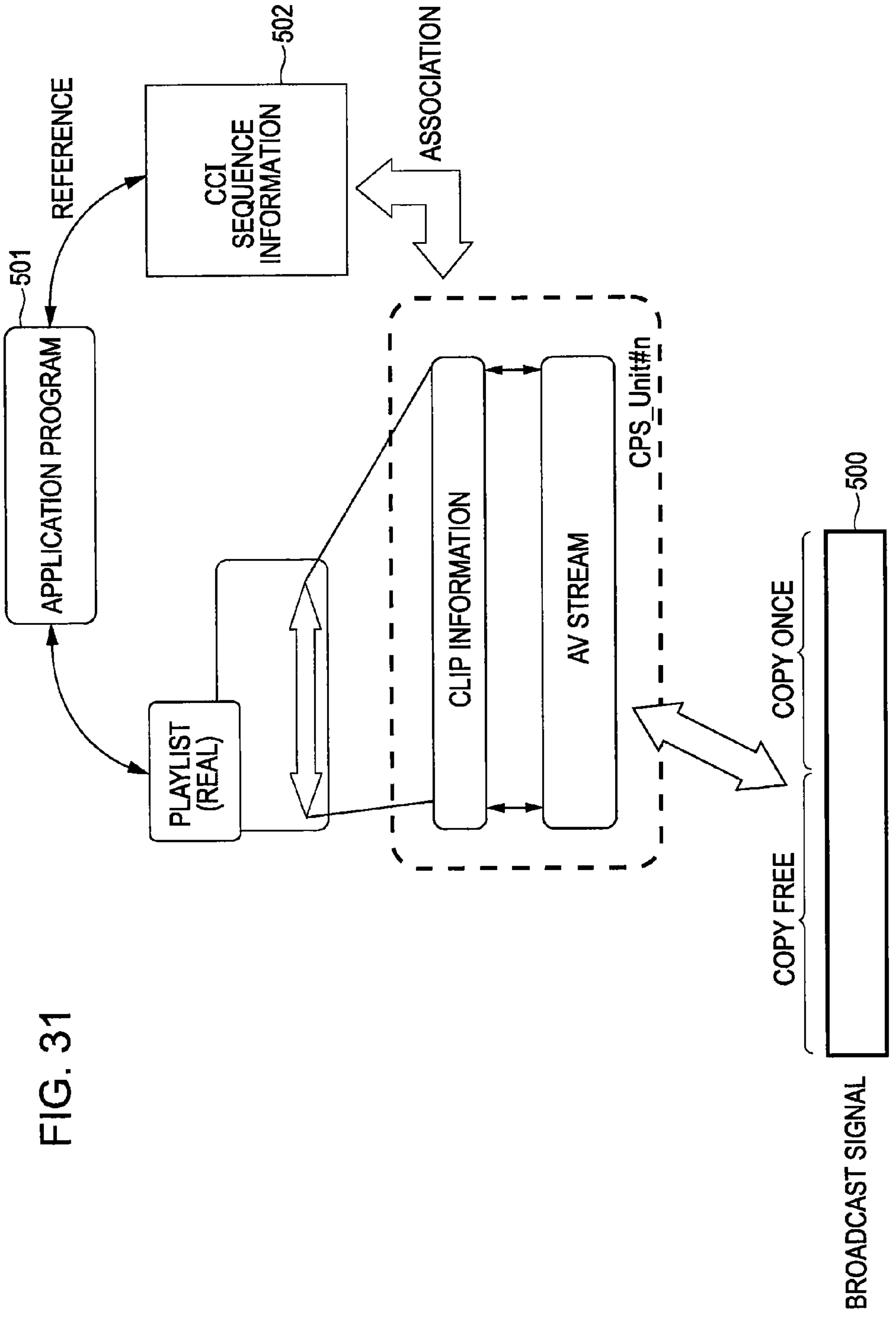
FIG. 31 is a diagram showing an example of usage of CCI Sequence Information in which information is recorded on a basis of individual points of change in CCI in clips.

Now, a specific example of processing will be described with reference to FIG. 31. The description will be given in the context of an example where content 500 including a copy free data portion and a copy once data portion is stored on an information recording medium and usage of content such as playback is controlled. The content 500 is transmitted from a broadcast station in the form of broadcast signals. At this time, CCI Sequence Information 502 associated with the content 500 is transmitted together. The information processing apparatus records the CCI Sequence Information 502 together with the content 500 on an information recording medium, as usage control information (CCI) associated with a CPS unit to which the content 500 belongs.

As described earlier with reference to FIG. 1 and other figures, the content 500 is set as a clip associated with a playlist, and, for example, usage control is exercised as a CPS unit associated with a clip. The CCI Sequence Information 502 is set as usage control information associated with a CPS unit associated with a clip.

When content is played back, an application program 501 of the information processing apparatus identifies a CPS unit of content to play back, and reads usage control information associated with the CPS unit identified. In this case, the information processing apparatus obtains the CCI Sequence Information 502. As described earlier with reference to FIG. 30, the CCI Sequence Information 502 includes:

Number of CCI sequence: Number of blocks having different CCI in a clip (in a CPS unit).

Start SPN for CCI Sequence: Information representing points of change (packet numbers) in CCI information.

The application program 501 is allowed to use content according to usage control information defined before and after a point of change in CCI. More specifically, the control information written in the CCI Sequence Information 502 together with CCI point-of-change information is copy free for a former half of content and copy once (copying is permitted only once) for a latter half of content. The application program 501 uses content according to this description.

By using CCI Sequence information in which CCI point-of-change information is recorded, even when a plurality of different pieces of data subject to usage control is included in a single CPS unit, usage control can be exercised correctly for each data type.

Figure 32:
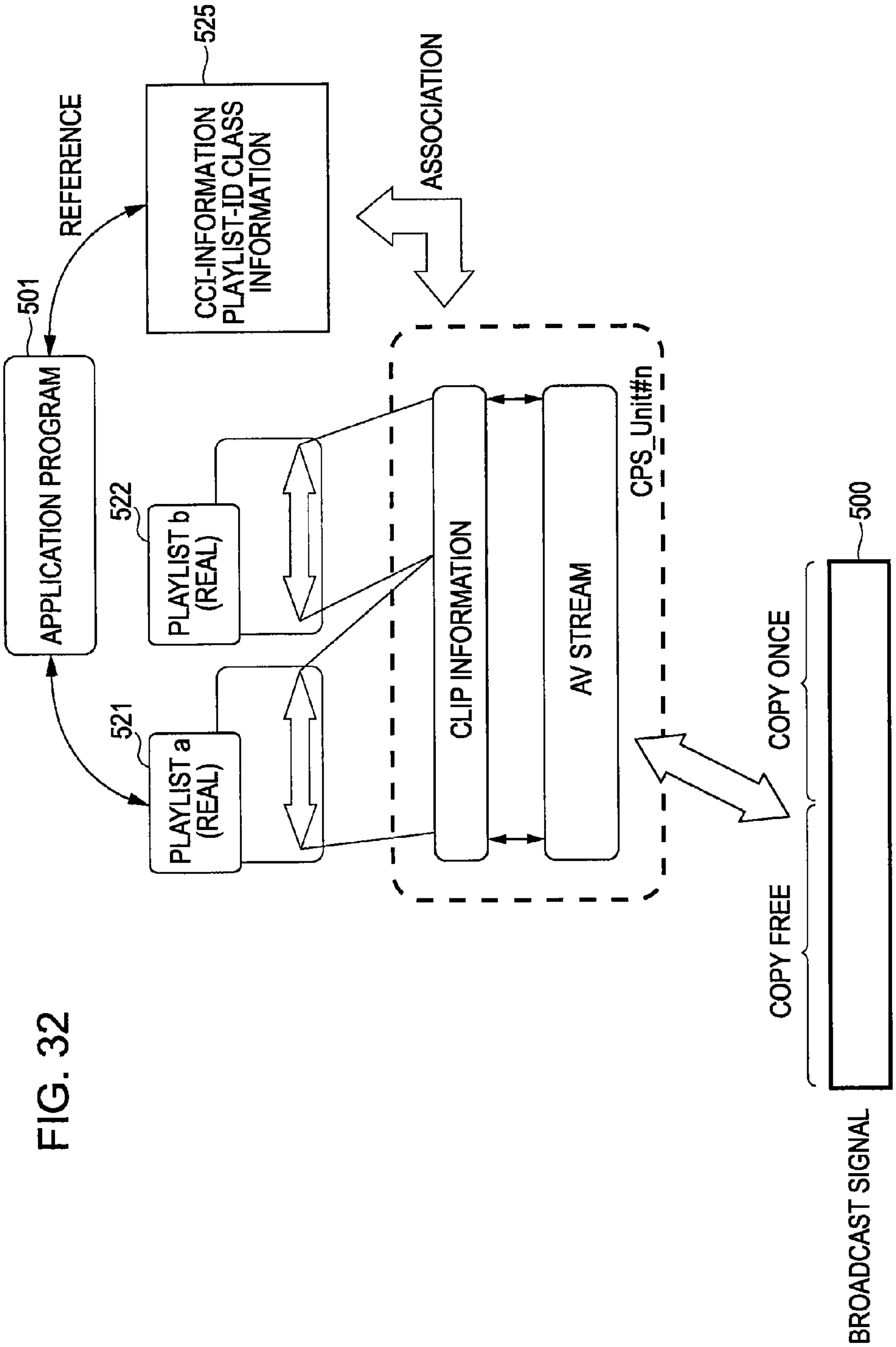
FIG. 32 is a diagram showing an example where content data parts for which usage control is to be exercised in different modes are associated with different playlists.

An example of scheme for implementing usage control in a plurality of different settings without using the CCI Sequence Information will be described with reference to FIG. 32. FIG. 32 shows an example where different playlists are associated with content data portions for which usage control is to be exercised in different modes.

For example, a playlist a 521 is set as a playlist suitable for playback of a copy free content part, and a playlist b 522 is set as a playlist suitable for a copy once content part.

CPS units are set in association with clips to which the content belongs, and usage control information (CCI) 525 is set in association with the CPS units. The usage control information (CCI) 525 is has a description structure in which usage control information is written for each playlist ID, as described earlier with reference to FIG. 27.

The application program 501 executes processing on the basis of the usage control information 525 in which usage control information is written for each playlist ID. More specifically, the application program 501 uses content according to control information specifying copy free for the former half of content while specifying copy once (copying is permitted only once) for the latter half of content.

5. Processes of Recording, Editing, and Playing Back Content

Figure 33:
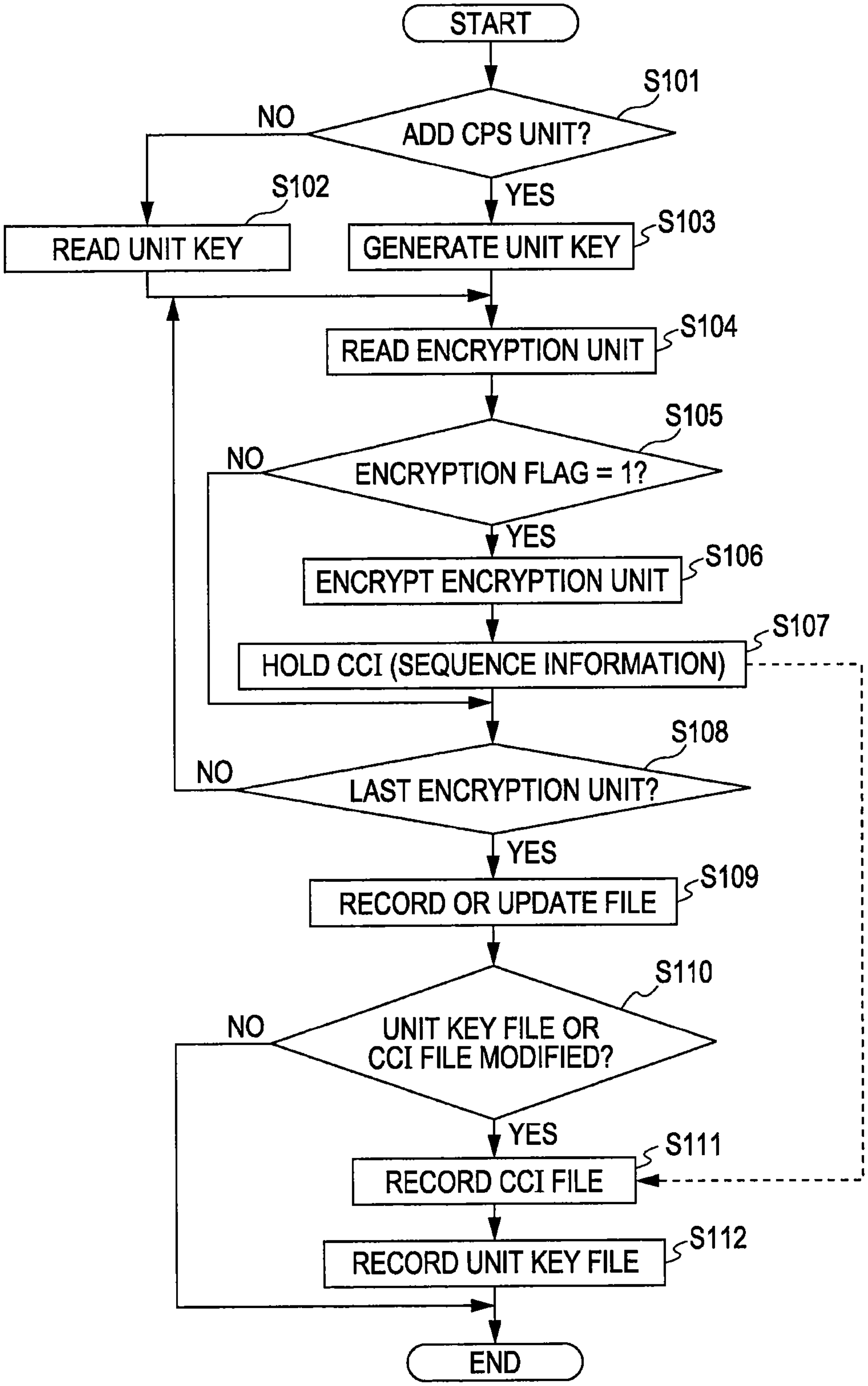
FIG. 33 is a flowchart showing the sequence of a process for recording data including content management units (CPS units)
Figure 34:
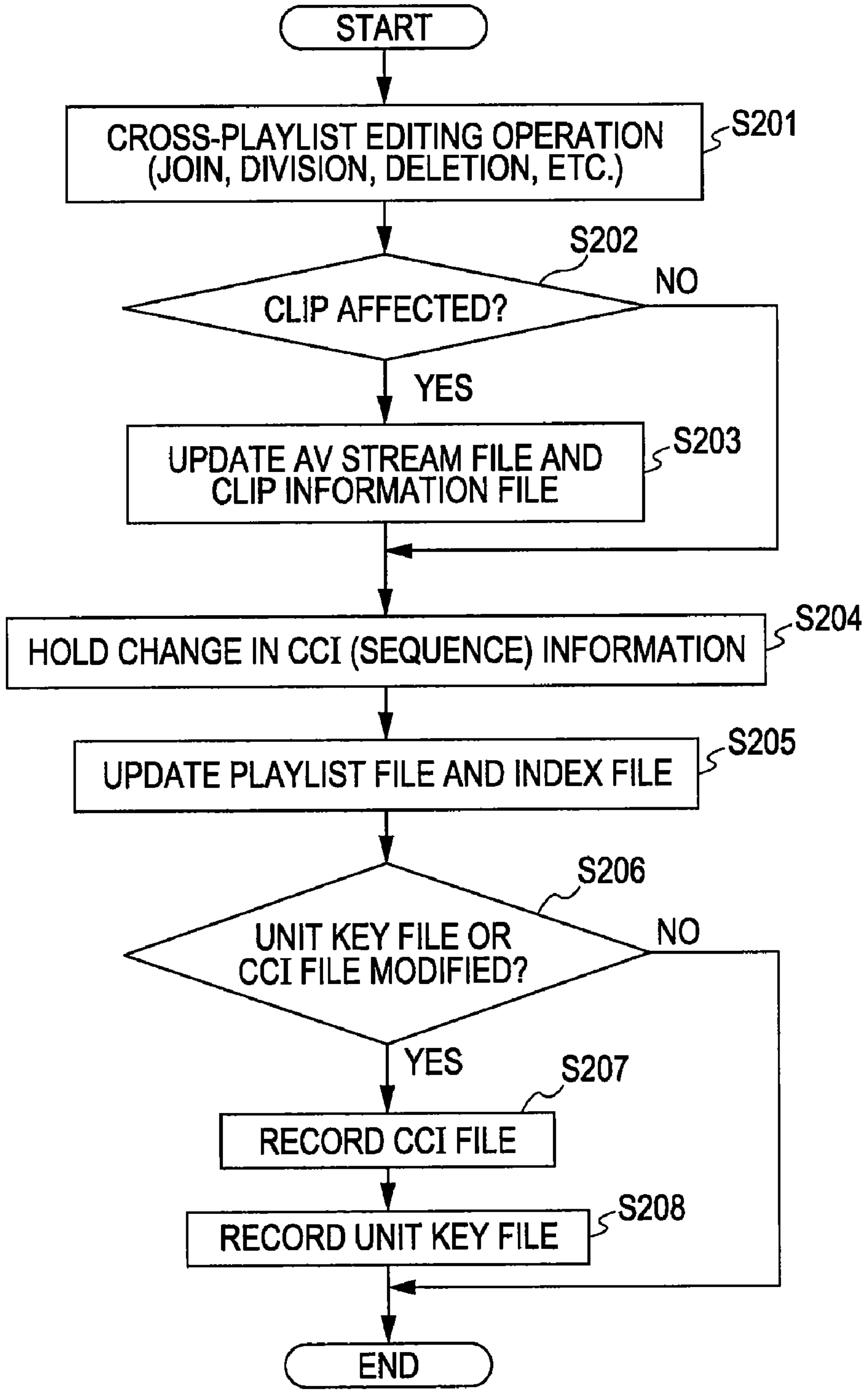
FIG. 34 is a flowchart showing the sequence of a process for editing data including content management units (CPS units)

Next, the execution sequences of processes of recording and editing content for which usage is controlled on the basis of content management units (CPS units) will be described with reference to flowcharts shown in FIGS. 33 and 34.

First, a process sequence for executing recording of content will be described with reference to FIG. 33. This process is executed by a data recording application executed by an information processing apparatus having mounted thereon an information recording medium that allows recording data thereon. Content that is to be recorded is, for example, broadcast content, or content input via a network such as the Internet or a LAN.

First, in step S101, it is checked whether a CPS unit associated with content to be recorded is to be newly added. When the setting is such that a CPS unit already set to the information recording medium is used so that the content is included in the CPS unit, a CPS unit is not added, and in step S102, a unit key is read from a CPS unit key recorded on the information recording medium. On the other hand, when a new CPS unit is to be set in association with the content to be recorded, in step S103, a CPS unit key associated with the new CPS unit is generated. For example, the key is generated by generating a random number.

Then, in step S104, an encryption unit of the content to be recorded is obtained. The content is divided into units of a predetermined data amount, and encryption flags associated with the individual units are assigned to control information. In step S105, an application that executes recording checks a flag associated with a unit to determine whether encryption is to be executed. An encryption unit is a unit by which switching of control information is allowed in input from broadcasting or from the Internet, and is not limited to a specific size or time length. Also, an encryption flag is not limited to a specific flag, and it refers to, for example, information for checking where encryption is to be executed, including processing by a recording apparatus for checking whether encryption is to be executed on the basis of change in copy control information described in usage control information (CCI) attached to an input signal.

When the encryption flag of an encryption unit is not 1, the unit need not be encrypted, so that the process proceeds to step S107. When the encryption flag of an encryption unit is 1, the unit is to be encrypted. Thus, in step S106, encryption is executed using a CPS unit key. Then, in step S107, the CCI information associated with the content to be recorded is stored in a memory. When the control information is changed in the middle of content, the CCI Sequence Information described earlier is used.

In step S108, it is checked whether the process has proceeded to the last encryption unit of the content to be recorded. When any unit is remaining, the process returns to step S104, and the same process is repeated. When it is determined in step S108 that the process has reached the last encryption unit of the content to be recorded, the process proceeds to step S109, in which various related files are recorded and updated. More specifically, in step S110, it is checked whether the unit key file and the usage control information (CCI) are to be updated. When the unit key file and the usage control information (CCI) file are to be updated, the usage control information (CCI) file is updated in step S111, and the CPS unit key file is updated in step S112. When a new CPS unit key is created, obviously, the unit key file is to be updated. Even when a new unit key is not generated, for example, when a CPS unit key file having information associated with a playlist is used and the associated playlist is changed or an associated playlist is added, the CPS unit key file is to be updated.

Next, the execution sequence of a content editing process will be described with reference to a flowchart shown in FIG. 34. This process is executed by an application of an information processing apparatus having mounted thereon an information recording medium that allows recording data thereon when content stored on the information recording medium is edited. The editing of content refers to processing such as joining, division, or deletion of playlists associated with content managed on the basis of CPS units.

In step S201, a playlist that is to be edited is selected, and a processing mode such as joining of playlists, division, or editing is determined on the basis of a user input. In step S202, it is checked whether a clip will be affected by the processing determined. For example, when a real playlist is deleted as described earlier, an associated clip is deleted. In this case, it is determined that a clip is affected. Even when a virtual playlist is deleted, a clip referred to by the virtual playlist is not affected.

When it is determined in step S202 that a clip will be affected, in step S203, file updating is executed in step S203, such as deletion of a clip and an AV stream file included in the clip. Then, in step S204, usage control information (CCI) related to the file updating is extracted. For example, when CCI is set in association with a clip and the clip is deleted, the CCI associated with the clip is no longer needed, so that the CCI file is extracted.

Then, in step S205, playlist files and index files are updated in accordance with the editing mode. Then, in step S206, it is checked whether the unit key file and the usage control information (CCI) file are to be updated. When these files are to be updated, the usage control information (CCI) file is updated in step S207, and the CPS unit key file is updated in step S208.

For example, when CCI is set in association with a clip and the clip is deleted, the CCI associated with the clip is no longer needed, so that the CCI file is deleted. As another example, when a CPS unit disappears or a clip or a playlist associated with a CPS unit key is changed through editing, the CPS unit key file is updated in accordance with the editing.

Figure 35:
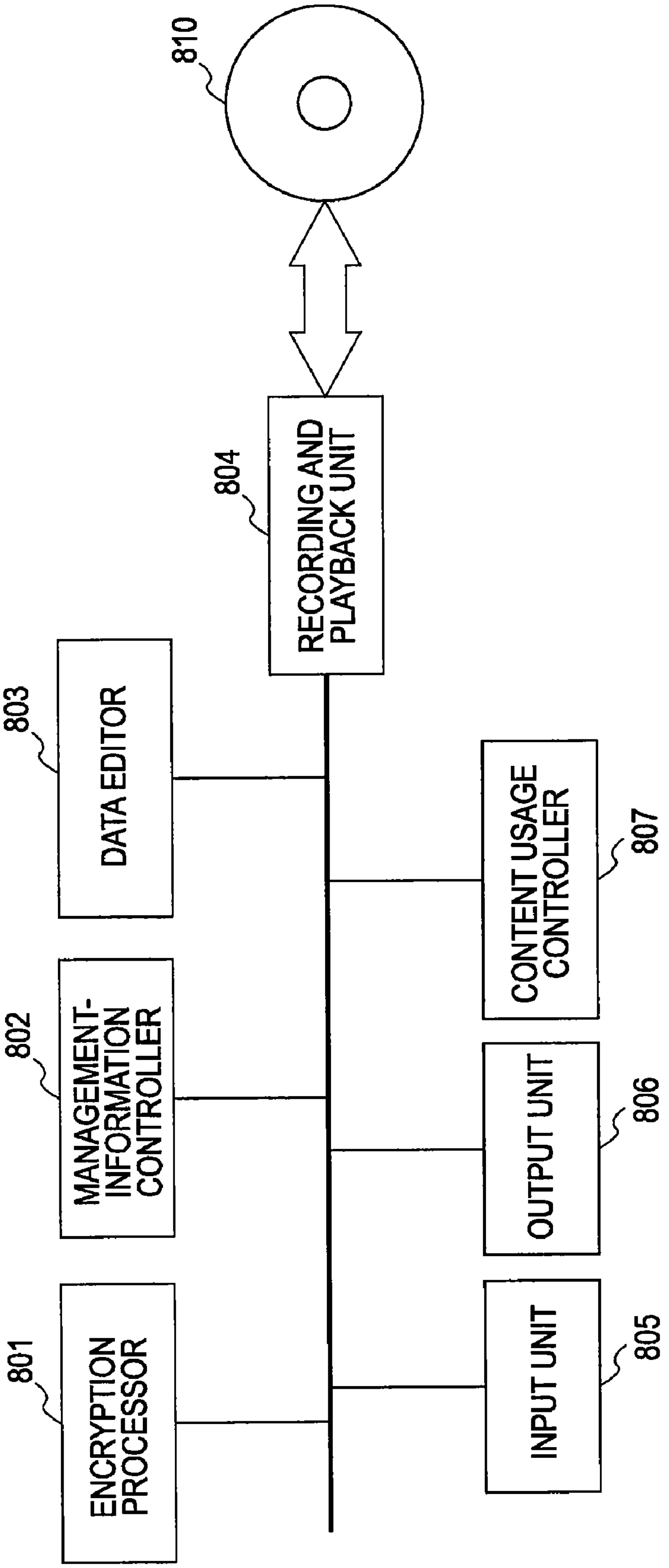
FIG. 35 is a block diagram showing functions of an information processing apparatus that executes a process of encrypting content and recording the encrypted content on an information recording medium and a process of decrypting, playing back, and using content recorded on an information recording medium.

FIG. 35 is a block diagram showing the functions of an information processing apparatus that executes a process of encrypting content and recording the encrypted content on an information recording medium and a process of decrypting, playing back, and using content recorded on an information recording medium.

When content is recorded on an information recording medium 810, an encryption processor 801 generates encrypted data associated with content management units (CPS units) that are set as units for controlling usage of content, using unit keys associated with the content management units. Furthermore, a management-information controller 802 generates or updates a unit key file storing unit keys and a usage control information file associated with content management units as management information associated with the encrypted data generated by the encryption processor 801. A recording and playback unit 804 records the encrypted data, the unit key file, and the usage control information file on an information recording medium 810 according to a predetermined data recording format.

The data recorded on an information recording medium 810 includes moving-image content composed of hierarchically structured data having index information, playlists, and clips including AV streams. The management-information controller 802 generates or updates unit key files of the various types described earlier, for example:

a) Unit key file including pieces of content management unit identification information associated with individual clips and pieces of unit key information associated with individual pieces of content management unit identification information;

b) Unit key file including pieces of content management unit identification information associated with individual playlists and pieces of unit key information associated with individual pieces of content management unit identification information;

c) Unit key file including pieces of unit key information associated with individual pieces of clip identification information; and d) Unit key file including pieces of unit key information associated with individual pieces of playlist identification information.

Furthermore, the management-information controller 802 generates or updates usage control information (CCI) files of the various types described earlier, for example:

a) Usage control information in which different pieces of control information are recorded on a basis of individual identifiers of playlists, clips, or titles associated with pieces of content; and b) Usage control information in which different pieces of control information are recorded on a basis of individual points of change in control information in clips.

A data editor 803 executes editing of content stored on the information recording medium 810. For example, the data editor 803 executes joining, division, or deletion. In accordance with the processing executed by the data editor 803, the management-information controller 802 updates a unit key file storing unit keys or a usage control information file associated with content management units.

When content recorded on the information recording medium 810 is executed, the encryption processor 801 obtains a unit key associated with a content management unit that is set as a unit for controlling usage of content from the unit key file, and decrypts encrypted content recorded on the information recording medium 810 using the unit key obtained. Furthermore, a content usage controller 807 obtains usage control information associated with the content management unit to which the content decrypted by the encryption processor 801 belongs, and uses the content according to the usage control information obtained.

For example, the content usage controller 807 uses content in different usage control modes in accordance with playlists, clips, or titles according to usage control information in which different pieces of usage control information are recorded on a basis of individual identifiers of playlists, clips, or titles associated with pieces of content. Furthermore, the content usage controller 807 exercises usage control according to usage control information in which different pieces of control information are recorded on a basis of points of change in control information in clips, such as using content in different usage control modes before and after a point of change in control information.

A data input unit 805 is used to input content to be recorded, or content specification information or editing process information from a user. A data output unit 806 is used, for example, to output content that is played back.

6. Example Configuration of Information Processing Apparatus

Next, an example hardware configuration of an information processing apparatus that executes recording or playback of content will be described with reference to FIG. 36.

Figure 36:
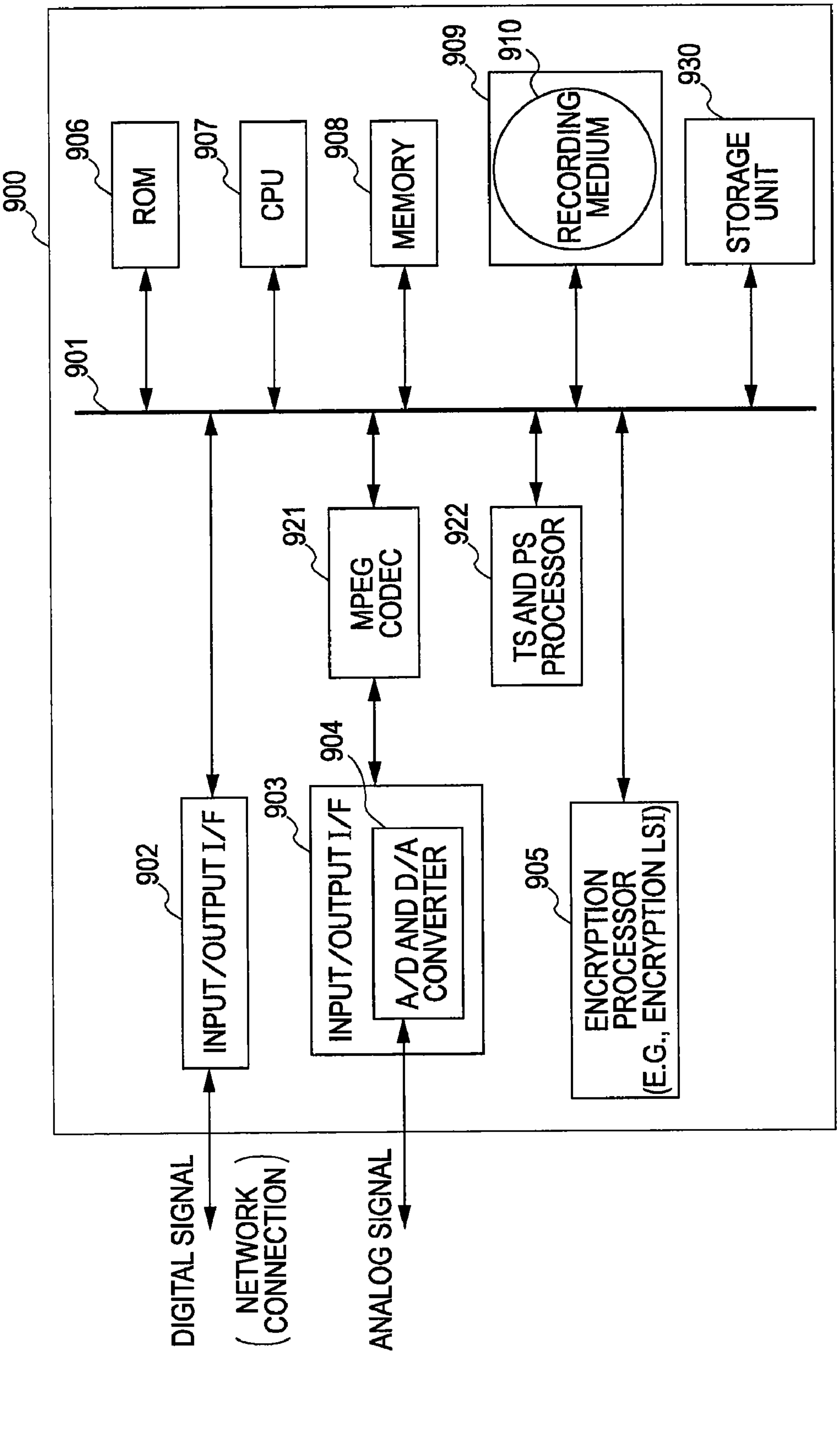
FIG. 36 is a diagram showing an example configuration of an information processing apparatus that executes playback or recording with an information recording medium mounted thereon.

Referring to FIG. 36, an information processing apparatus 900 includes a drive 909 that drives an information recording medium 910 and that inputs and outputs data recording and playback signals, a CPU 907 as a controller that executes data processing according to various programs, a ROM 906 as an area for storing programs, parameters, and so forth, a memory 908, an input/output I/F 902 that inputs and outputs digital signals, an input/output I/F 903 that inputs and outputs analog signals, including an A/D and D/A converter 904, an MPEG codec 921 that encodes and decodes MPEG data, a TS and PS processor 922 that processes a TS (transport stream) and a PS (program stream), an encryption processor 905 that executes various types of encryption processes, and a storage device 930 that serves as a local storage for storing various types of data and data processing programs, such as a hard disc. Each of these blocks is connected to a bus 901.

For example, when AV stream data composed of MPEG-TS data stored on the information recording medium 910 is played back by the information processing apparatus 900, data read from the information recording medium 910 by the drive 909 is decrypted by the encryption processor 905 as needed, and the decrypted data is divided by the TS and PS processor 922 into pieces of data such as video data, audio data, and subtitle data.

Furthermore, digital data decoded by the MPEG codec 921 is converted into analog signals for output by the D/A converter 904 in the input/output I/F 903. In the case of digital output, MPEG-TS data decrypted by the encryption processor 905 is output as digital data via the input/output I/F 902. In this case, the output is directed to a digital interface such as an IEEE 1394 interface, an Ethernet cable, or a wireless LAN. When internetworking is to be allowed, the input/output I/F 902 is provided with a function of network connection.

When data is converted within the information processing apparatus 900 before output into a format acceptable by a device at an output destination, rate conversion and codec conversion are executed by the MPEG codec 921 on the video data, audio data, subtitle data, and so forth once separated by the TS and PS processor 922, and digital data multiplexed again with MPEG-TS or MPEG-PS is output from the digital input/output I/F 902. Alternatively, conversion into a non-MPEG format and multiplexed file may be executed under the control of the CPU 907 for output from the digital input/output I/F 902.

Management information associated with CPS units, such as usage control information and a CPS unit key file, is read from the information recording medium 910 and then stored in the memory 908. Key information for individual CPS units, used for playback, can be obtained from the data stored in the memory 908.

Next, an operation executed by the information processing apparatus 900 for recording data obtained, for example, by receiving broadcast signals will be described. Two types of data that is to be recorded can be assumed, namely, input of digital signals and input of analog signals. In the case of digital signals, data input from the digital input/output I/F 902 and encrypted suitably by the encryption processor 905 as needed is saved on the information recording medium 910.

When the data format of the input digital signals is converted before the data is saved, the data is converted by the MPEG codec 921, the CPU 907, and the TS and PS processor 922 into a data format for saving, and the data is saved on the information recording medium 910 after being suitably encrypted by the encryption processor 905 using CPS unit keys as described earlier. In the case of analog signals, analog signals input to the input/output I/F 903 is converted into digital signals by the A/D converter 904, and the digital signals are converted by the MPEG codec 921 into a format for recording.

Then, the data is converted by the TS and PS processor 922 into a recording format of AV multiplexed data, and the data is saved on the information recording medium 910 after being encrypted suitably by the encryption processor 905 as needed.

When information used in the information processing apparatus 900 is obtained via an external network, data obtained is temporarily saved in the memory 908 in the information processing apparatus 900. The data saved is, for example, key information for used to play back content, data played back together when content is played back, such as subtitles, audio data, or still-image data, and content management information such as content usage control information (CCI).

Programs for executing playback and recording are stored in the ROM 906. When the programs are executed, the memory 908 is used as needed as an area for storing parameters and data and as a work area. Although the configuration of an apparatus that is capable of recording and playing back data is shown in FIG. 36, it is possible to implement an apparatus that is only capable of playback or that is only capable of recording, similarly to the embodiments described above.

Although the embodiments of the present invention have been described above, obviously, it is possible for those skilled in the art to make modifications or alternatives of the embodiments without departing from the spirit of the present invention. That is, the present invention has been described by way of examples, and the present invention should not be construed restrictively. The spirit of the present invention should be construed according to the claims.

The series of processes described in this specification can be executed by hardware, by software, or by combination of hardware and software. When the processes are executed by software, programs in which processing sequences are recorded are installed and executed in a memory of a computer embedded in special hardware, or the programs are installed and executed on a general-purpose computer that is capable of executing various processes.

For example, the programs can be recorded in advance on a hard disc or a read-only memory that serves as a recording medium. Alternatively, the programs may be temporarily or permanently stored (recorded) on a removable recording medium such as a flexible disc, a compact disc read-only memory (CD-ROM), a magneto-optical (MO) disc, a digital versatile disc (DVD), a magnetic disc, or a semiconductor memory. Such a removable recording medium can be provided in the form of what is called package software.

Instead of installing the programs on a computer from the removable recording medium described above, the programs may be transferred by wireless to a computer from a downloading site or transferred by wire to a computer via a network such as a local area network (LAN) or the Internet, so that the computer can receive the programs transferred and install the programs on an internal recording medium such as a hard disc.

The various processes described in this specification may be executed in parallel or individually as needed or in accordance with the processing ability of an apparatus that executes the processes, instead of being executed sequentially in the orders described. A system in this specification refers to a logical combination of a plurality of apparatuses, and is not limited to one in which constituent apparatuses exist within the same case.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An information processing apparatus comprising:

a recorder;

a management information controller;

a processor; and a memory device which stores instructions, which when executed by the processor, cause the processor to operate with the recorder and the management information controller to:

(a) determine that content is to be recorded on an information recording medium, the content being associated with usage control information;

(b) determine whether a first content management unit is recorded on the information recording medium, the first content management unit being distinct from the information recording medium and the first content management unit including a plurality of storage areas, the plurality of storage areas of the first content management unit including at least a first unit key file and a first usage-control-information file, the first unit key file having a first unit key stored therein prior to determining that the content is to be recorded on the information recording medium;

(c) if the first content management unit is recorded on the information recording medium:

(i) determine whether to record the content in one of the plurality of storage areas of the first content management unit; and (ii) if the determination is to record the content in one of the plurality of storage areas of the first content management unit:

(A) obtain the first unit key stored in the first unit key file;

(B) record any usage control information associated with the content to be recorded in the first usage-control-information file, the usage control information recorded in the first usage-control-information file not being encrypted;

(C) encrypt the content to be recorded by executing encryption using the stored first unit key; and (D) record the encrypted content in at least a first one of the plurality of storage areas of the first content management unit; and (d) if the first content management unit is not recorded on the information recording medium:

(i) determine to record a second content management unit on the information recording medium, the second content management unit including a plurality of storage areas, the plurality of storage areas of the second content management unit including at least a second unit key file and a second usage-control-information file;

(ii) utilize a second data based on a second random determination to generate a second unit key and store the generated second unit key in the second unit key file, the second unit key being distinct from the second data;

(iii) store any usage control information associated with the content to be recorded in the second usage-control-information file, the usage control information stored in the second usage-control-information file not being encrypted;

(iv) encrypt the content to be recorded by executing encryption using the generated second unit key;

(v) store the encrypted content in a first one of the plurality of storage areas of the second content management unit; and (vi) record the second content management unit on the information recording medium according to a predetermined data recording format such that the encrypted content stored in the first one of the storage areas of the second content management unit, the second unit key stored in the second unit key file, and the usage control information stored in the second usage-control-information file are each recorded on the information recording medium.

2. The information processing apparatus of claim 1, wherein:

(a) the recorded encrypted content includes moving-image content composed of hierarchically structured data having:

(i) one or more playlists; and
(ii) one or more clips including one or more audio-video streams; and
(b) each unit key file includes:
(i) pieces of content-management-unit identification information associated with the individual clips; and
(ii) pieces of unit key information associated with the individual pieces of content-management-unit identification information.

3. The information processing apparatus of claim 1, wherein:
(a) the recorded encrypted content includes moving-image content composed of hierarchically structured data having:
(i) one or more playlists; and
(ii) one or more clips including one or more audio-video streams; and
(b) each unit key file includes:
(i) pieces of content-management-unit identification information associated with the individual playlists; and
(ii) pieces of unit key information associated with the individual pieces of content-management-unit identification information.

4. The information processing apparatus of claim 1, wherein:
(a) the recorded encrypted content includes moving-image content composed of hierarchically structured data having:
(i) one or more playlists; and
(ii) one or more clips including one or more audio-video streams; and
(b) each unit key file includes pieces of unit key information associated with individual pieces of clip identification information.

5. The information processing apparatus of claim 1, wherein:
(a) the recorded encrypted content includes moving-image content composed of hierarchically structured data having:
(i)one or more playlists; and
(ii) one or more clips including one or more audio-video streams; and
(b) each unit key file includes pieces of unit key information associated with individual pieces of playlist identification information.

6. The information processing apparatus of claim 1, wherein:
(a) the recorded, encrypted content includes moving-image content composed of hierarchically structured data having:
(i) one or more playlists; and
(ii) one or more clips including one or more audio-video streams; and
(b) when executed by the processor, the instructions cause the processor to operate with the management-information controller to generate or update the usage-control-information file in which different pieces of usage control information are recorded in association with individual identifiers of at least one of playlists, clips, and titles associated with pieces of content.

7. The information processing apparatus of claim 1, wherein:
(a) the recorded encrypted content includes moving-image content composed of hierarchically structured data having:
(i) one or more playlists; and
(ii) one or more clips including one or more audio-video streams; and
(b) when executed by the processor, the instructions cause the processor to operate with the management-information controller to generate or update the usage-control-information file in which different pieces of usage control information are recorded in association with individual points of change in usage control information in the clips.

8. The information processing apparatus of claim 1, wherein:
(a) the recorded encrypted content includes moving-image content composed of hierarchically structured data having:
(i) one or more playlists; and
(ii) one or more clips including one or more audio-video streams;
(b) the information processing apparatus further includes a data editor configured to execute joining, division, or deletion of the playlists; and
(c) when executed by the processor, the instructions cause the processor to operate with the management-information controller to update any unit key file or any usage-control-information file in accordance with processing executed by the data editor.

9. The information processing apparatus of claim 1, wherein for each unit key file, the unit key file includes an application type indicating whether the unit key file is recorded according to a recording format for which a specification regarding editing of encrypted or decrypted content is defined or in which a program file is not included, or the unit key file is recorded according to a playback format for which a specification regarding editing of encrypted or decrypted content is not defined or in which a program file is included.

10. The information processing apparatus according to claim 9, wherein:
(a) the recorded encrypted content includes content composed of hierarchically structured data having:
(i) one or more playlists; and
(ii) one or more clips including one or more audio-video streams;
(b) the content management unit having at least one storage area within which the encrypted content is stored is set in association with:
(i) the individual clips when the encrypted content is recorded according to the recording format; and
(ii) individual titles that serve as logical units when the data is recorded according to the playback format.

11. An information processing apparatus for playing back a content recorded on an information recording medium, the information processing apparatus comprising:
a content-usage controller;
a processor; and
a memory device storing instructions which, when executed by the processor, cause the processor to operate with the content-usage controller to:
(a) determine which of a plurality of content management units recorded on the information recording medium are associated with the content, each of the content management units being distinct from each other, being distinct from the information recording medium, and including a plurality of storage areas, the storage areas of each of the content management units storing at least a unit key file, encrypted content, and a usage-control-information file, the unit key files stored in the content management units being distinct from each other; and (b) after determining which content management units are associated with the content, for each determined content management unit:

(i) obtain a unit key stored in the unit key file of the content management unit, the unit key having been previously generated based on a first data based on a first random determination, the unit key being distinct from the first data and from each unit key stored in each of the other content management units;

(ii) using the obtained unit key, decrypt the encrypted content stored in a first one of the storage areas of the content management unit;

(iii) obtain usage control information stored in the usage-control-information file of the content management unit, the usage control information not being encrypted; and (iv) use the decrypted content according to the obtained usage control information.

12. The information processing apparatus of claim 11, wherein, for at least one of the content management units:

(a) the encrypted content includes moving-image content composed of hierarchically structured data having:

(i) one or more playlists; and (ii) one or more clips including one or more audio-video streams; and (b) when executed by the processor, the instructions cause the processor to operate with the content-usage controller to use the decrypted content in different modes of usage control in accordance with playlists, clips, or titles associated with pieces of content based on usage control information associated with the decrypted content in which different pieces of control information are recorded in association with individual identifiers of at least one of the playlists, the clips, and the pieces of content.

13. The information processing apparatus of claim 11, wherein, for at least one of the content management units:

(a) the encrypted content includes moving-image content composed of hierarchically structured data having:

(i) one or more playlists; and (ii) one or more clips including one or more audio-video streams; and (b) when executed by the processor, the instructions cause the processor to operate with the content-usage controller to use the decrypted content in different modes of usage control before and after points of change in control information in the clips based on usage control information associated with the decrypted content in which different pieces of control information are recorded in association with the individual points of change in control information.

14. A method of operating an information processing apparatus for recording content on an information recording medium, the information processing apparatus including a plurality of instructions, the method comprising:

(a) causing at least one processor to execute the plurality of instructions to determine that content is to be recorded on the information recording medium, the content being associated with usage control information;

(b) causing the at least one processor to execute the plurality of instructions to determine whether a first content management unit is recorded on the information recording medium, the first content management unit being distinct from the information recording medium and the first content management unit including a plurality of storage areas, the plurality of storage areas of the first content management unit including at least a first unit key file and a first usage-control-information file, the first unit key file having a first unit key stored therein prior to determining that the content is to be recorded on the information recording medium;

(c) if the first content management unit is recorded on the information recording medium, causing the at least one processor execute the plurality of instructions to:

(i) determine whether to record the content in one of the plurality of storage areas of the first content management unit; and (ii) if the determination is to record the content in one of the plurality of storage areas of the first content management unit:

(A) obtain the first unit key stored in the first unit key file;

(B) cause any usage control information associated with the content to be recorded in the first usage-control-information file, the usage control information recorded in the first usage-control-information file not being encrypted;

(C) cause the content to be encrypted by causing encryption to be executed using the stored first unit key; and (D) cause the encrypted content to be recorded in at least a first one of the plurality of storage areas of the first content management unit; and (d) if the first content management unit is not recorded on the information recording medium, causing the at least one processor execute the instructions to:

(i) determine to record a second content management unit on the information recording medium, the second content management unit including a plurality of storage areas, the plurality of storage areas of the second content management unit including at least a second unit key file and a second usage-control-information file;

(ii) utilize a second data based on a second random determination to generate a second unit key, the generated second unit key being stored in the second unit key file and the second unit key being distinct from the second data;

(iii) cause any usage control information associated with the content to be stored in the second usage-control-information file, the usage control information stored in the second usage-control-information file not being encrypted;

(iv) cause the content to be encrypted by causing encryption to be executed using the generated first unit key;

(v) cause the encrypted content to be stored in a first one of the plurality of storage areas of the second content management unit; and (vi) cause the second content management unit to be recorded on the information recording medium according to a predetermined data recording format such that the encrypted content stored in the first one of the storage areas of the second content management unit, the second unit key stored in the second unit key file, and the usage control information stored in the second usage-control-information file are each recorded on the information recording medium.

15. The method of claim 14, wherein:

(a) the recorded encrypted content includes moving-image content composed of hierarchically structured data having:

(i) one or more playlists; and (ii) one or more clips including one or more audio-video streams; and (b) each unit key file includes:

(i) pieces of content-management-unit identification information associated with the individual clips; and (ii) pieces of unit key information associated with the individual pieces of content-management-unit identification information.

16. The method of claim 14, wherein:

(a) the recorded encrypted content includes moving-image content composed of hierarchically structured data having:

(i) one or more playlists; and (ii) one or more clips including one or more audio-video streams; and (b) each usage-control-information file includes different pieces of control information which are recorded in association with individual identifiers of at least one of playlists, clips, and titles associated with pieces of content.

17. The method of claim 14, wherein:

(a) the recorded encrypted content includes moving-image content composed of hierarchically structured data having:

(i) one or more playlists; and (ii) one or more clips including one or more audio-video streams; and (b) each usage-control-information file includes different pieces of control information which are recorded in association with individual points of change in control information in the clips.

18. The method of claim 14, wherein:

(a) the recorded encrypted content includes moving-image content composed of hierarchically structured data having:

(i) one or more playlists; and (ii) one or more clips including one or more audio-video streams;

(b) the method includes:

(i) causing the at least one processor to execute the plurality of instructions to edit data, the editing involving joining, dividing, or deleting of the playlists; and (ii) causing the at least one processor to execute the plurality of instructions to update any unit key file or any usage-control-information file in accordance with processing executed in the data editing step.

19. A method of operating an information processing apparatus for playing back a content recorded on an information recording medium, the information processing apparatus having a plurality of instructions, the method comprising:

(a) causing at least one processor to execute the plurality of instructions to determine which of a plurality of content management units recorded on the information recording medium are associated with the content, each of the content management units being distinct from each other, being distinct from the information recording medium, and including a plurality of storage areas, the storage areas of each of the content management units storing at least a unit key file, encrypted content, and a usage-control-information file, the unit key files stored in the content management units being distinct from each other; and (b) after determining which content management units are associated with the content, for each determined content management unit, causing the at least one processor to execute the plurality of instructions to:

(i) cause a unit key stored in the unit key file of the content management unit to be obtained, the unit key having been previously generated based on a first data based on a first random determination, the unit key being distinct from the first data and from each unit key stored in each of the other content management units;

(ii) use the obtained unit key to decrypt the encrypted content stored in a first one of the storage areas of the content management unit;

(iii) cause usage control information stored in the usage-control-information file of the content management unit to be obtained, the usage control information not being encrypted; and (iv) cause the decrypted content to be used according to the obtained usage control information.

20. The method of claim 19, wherein, for at least one of the content management units:

(a) the encrypted content includes moving-image content composed of hierarchically structured data having:

(i) one or more playlists; and (ii) one or more clips including one or more audio-video streams; and (b) the method includes causing the at least one processor to execute the plurality of instructions to cause the decrypted content to be used in different modes of usage control in accordance with playlists, clips, or titles associated with pieces of content based on usage control information associated with the decrypted content in which different pieces of control information are recorded in association with individual identifiers of at least one of the playlists, the clips, and the pieces of content.

21. The method of claim 19, wherein, for at least one of the content management units:

(a) the encrypted content includes moving-image content composed of hierarchically structured data having:

(i) one or more playlists; and (ii) one or more clips including one or more audio-video streams; and (b) the method includes causing the at least one processor to execute the plurality of instructions to cause the decrypted content to be used in different modes of usage control before and after points of change in control information in the clips based on usage control information associated with the decrypted content in which different pieces of control information are recorded in association with the individual points of change in control information.

22. A non-transitory computer readable medium for allowing a computer to execute a process of recording content on an information recording medium, the computer readable medium including a plurality of instructions structured to cause the computer to:

(a) determine that content is to be recorded on the information recording medium, the content being associated with usage control information;

(b) determine whether a first content management unit is recorded on the information recording medium, the first content management unit being distinct from the information recording medium and the first content management unit including a plurality of storage areas, the plurality of storage areas of the first content management unit including at least a first unit key file and a first usage-control-information file, the first unit key file having a first unit key stored therein prior to determining that the content is to be recorded on the information recording medium;

(c) if the first content management unit is recorded on the information recording medium:
(i) determine whether to record the content in one of the plurality of storage areas of the first content management unit; and
(ii) if the determination is to record the content in one of the plurality of storage areas of the first content management unit:
(A) utilize a first data based on a first random determination to generate a first unit key and record the generated first unit key in the first unit key file, the first unit key being distinct from the first data;
(B) record any usage control information associated with the content to be recorded in the first usage-control-information file, the usage control information recorded in the first usage-control-information file not being encrypted;
(C) encrypt the content to be recorded by executing encryption using the stored first unit key; and
(D) record the encrypted content in at least a first one of the plurality of storage areas of the first content management unit; and
(d) if the first content management unit is not recorded on the information recording medium:
(i) determine to record a second content management unit on the information recording medium, the second content management unit including a plurality of storage areas, the plurality of storage areas of the second content management unit including at least a second unit key file and a second usage-control-information file;
(ii) utilize a second data based on a second random determination to generate a second unit key and store the generated second unit key in the second unit key file, the second unit key being distinct from the second data;
(iii) store any usage control information associated with the content to be recorded in the second usage-control-information file, the usage control information stored in the second usage-control-information file not being encrypted;
(iv) encrypt the content to be recorded by executing encryption using the generated second unit key;
(v) store the encrypted content in a first one of the plurality of storage areas of the second content management unit; and
(iv) record the second content management unit on the information recording medium according to a predetermined data recording format such that the encrypted content stored in the first one of the storage areas of the second content management unit, the second unit key stored in the second unit key file, and the usage control information stored in the second usage-control-information file are each recorded on the information recording medium.

23. A non-transitory computer readable medium for allowing a computer to execute a process of playing back a content recorded on an information recording medium, the computer readable medium including instructions structured to cause the computer to:
(a) determine which of a plurality of content management units recorded on the information recording medium are associated with the content, each of the content management units being distinct from each other, being distinct from the information recording medium, and including a plurality of storage areas, the storage areas of each of the content management units including at least a unit key file and a usage-control-information file, the unit key files stored in the content management units being distinct from each other; and
(b) after determining which content management units are associated with the content, for each determined content management unit:
(i) obtain a unit key stored in the unit key file of the content management unit, the unit key having been previously generated based on a first data based on a first random determination, the unit key being distinct from the first data and from each unit key stored in each of the other content management units;
(ii) using the obtained unit key, decrypt the encrypted content stored in a first one of the storage areas of the content management unit;
(iii) obtain usage control information stored in the usage-control-information file of the content management unit, the usage control information not being encrypted; and
(iv) use the decrypted content according to the obtained usage control information.

24. A non-transitory information recording medium comprising:
a plurality of distinct content management units recorded on the information recording medium, each of a plurality of the distinct content management units being associated with a portion of a single content, each of the distinct content management units comprising:
(i) a plurality of storage areas, the storage areas including at least a unit key file and a usage-control-information file, the unit key file being distinct from each unit key file stored in each of the other distinct content management units;
(ii) encrypted content being managed on the basis of hierarchically structured data having:
(a) one or more playlists; and
(b) one or more clips including one or more audio-video streams;
(iii) at least one unit key stored in the unit key file, the unit key having been previously generated based on a first data based on a first random determination, the unit key being distinct from the first data and from each unit key stored in each of the other distinct content management units, the unit key file including an application type indicating whether the unit key file is recorded according to a recording format for which a specification regarding editing of content is defined or in which a program file is not included, or the unit key file is recorded according to a playback format for which a specification regarding editing of content is not defined or in which a program file is included; and
(iv) usage control information stored in the usage-control-information file, the usage control information not being encrypted.

25. The information recording medium of claim 24, wherein, for at least one of the distinct content management units, the encrypted content being managed on that distinct content management unit varies depending on the application type.

* * * * *